US012481676B2

(12) United States Patent
Prall et al.

(10) Patent No.: US 12,481,676 B2
(45) Date of Patent: *Nov. 25, 2025

(54) USER INTERFACE FOR REAL-TIME DATA SYNCHRONIZATION WITHIN A DATABASE PLATFORM

(71) Applicant: State Farm Mutual Automobile Insurance Company, Bloomington, IL (US)

(72) Inventors: Jeffrey M. Prall, Normal, IL (US); Arunraj Radhakrishnan, Bloomington, IL (US); Srikanth R. Thummeti, Bloomington, IL (US); Venkata R. Paidi, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/808,803

(22) Filed: Aug. 19, 2024

(65) Prior Publication Data

US 2024/0411776 A1 Dec. 12, 2024

Related U.S. Application Data

(63) Continuation of application No. 17/546,459, filed on Dec. 9, 2021, now Pat. No. 12,105,731.

(60) Provisional application No. 63/123,927, filed on Dec. 10, 2020.

(51) Int. Cl.
*G06F 16/27* (2019.01)
*G06Q 30/0201* (2023.01)

(52) U.S. Cl.
CPC ......... *G06F 16/27* (2019.01); *G06Q 30/0201* (2013.01)

(58) Field of Classification Search
None
See application file for complete search history.

(56) References Cited

U.S. PATENT DOCUMENTS

| 10,475,054 | B1 | 11/2019 | Riazzi et al. |
| 10,867,003 | B2 | 12/2020 | Christopher |
| 11,500,892 | B1 | 11/2022 | Orlinsky et al. |
| 2007/0106674 | A1 | 5/2007 | Agrawal et al. |
| 2014/0006354 | A1 | 1/2014 | Parkison et al. |

(Continued)

FOREIGN PATENT DOCUMENTS

WO 2015113002 A2 7/2015

*Primary Examiner* — Amresh Singh
(74) *Attorney, Agent, or Firm* — Armstrong Teasdale LLP

(57) ABSTRACT

A system for real-time data synchronization within a database platform may be provided. The system includes a LRM computing device including a processor in communication with one or more data sources and an eCRM platform. The processor may be configured to (i) cause an input page to be displayed on a user computing device; (ii) create in real-time a query including an identifier received using the input page; (iii) initiate in real-time an API call including the query; (iv) cause, in real-time and using the API call, the eCRM platform and the one or more data sources to compare the identifier to lead referral information stored on the one or more data sources and the eCRM platform; and (v) in response to no match being found in the comparison, automatically create and store a lead referral data entry on the one or more data sources and the eCRM platform.

20 Claims, 20 Drawing Sheets

(56) References Cited

U.S. PATENT DOCUMENTS

2016/0006875 A1 1/2016 Burmeister et al.
2016/0189163 A1 6/2016 Jonsson et al.

USER INTERFACE FOR REAL-TIME DATA SYNCHRONIZATION WITHIN A DATABASE PLATFORM

CROSS-REFERENCE TO RELATED APPLICATIONS

This application is a continuation of U.S. patent application Ser. No. 17/546,459, filed Dec. 9, 2021, entitled "USER INTERFACE FOR REAL-TIME DATA SYNCHRONIZATION WITHIN A DATABASE PLATFORM," which claims the benefit of priority to U.S. Provisional Patent Application Ser. No. 63/123,927, filed Dec. 10, 2020, the entire contents and disclosures of which are hereby incorporated herein by reference in their entirety.

FIELD OF USE

The present disclosure relates generally to real-time electronic management of data stored within a database platform and, more particularly, to a user interface for real-time data synchronization within a database platform.

BACKGROUND

Computer devices and computer networks are used in many applications. For example, computer devices may be utilized to capture and store leads for a business, sometimes referred to as "lead referrals", obtained by a user from a referrer. When a user obtains a lead referral, they may be required to save information associated with the lead referral, such as the name and contact information of the lead referral, in a spreadsheet or other document on the user's computer device. The user may then wish to upload the lead referral information into a computer system that maintains information associated with the business and, more particularly, customer relationships of the user. For example, the user may wish to upload lead referral information into an enterprise customer relationship management ("eCRM") platform in communication with the user's computer device. When using a conventional eCRM platform, this process can be burdensome and time consuming, as conventional eCRM platforms are not capable of interfacing with external data sources, such as saved documents on the user's computer device, thereby forcing the user to manually save and upload lead referral information every time a new lead referral is obtained or information associated with the lead referral changes.

In other words, when using a conventional eCRM platform, a user may need to load the lead referral information into a spreadsheet on their user computing device, and then upload the spreadsheet to the eCRM platform for storage. This upload process typically includes translating and/or reformatting the data so that it can be properly saved inside the eCRM platform. In at least some cases, this means uploading the spreadsheet to a first database that can perform this translating and reformatting before it is saved in the eCRM platform. This process of uploading, translating, and reformatting can typically take between 10 and 30 minutes (and in some cases even longer), and may require multiple different users to complete the process, which is very inconvenient for the primary user who needs the information saved and analyzed for matching data. A real-time system for uploading data into an eCRM platform is needed.

Additionally, the eCRM platforms may be used by a plurality of users who may upload lead referral information into the eCRM platforms. When using conventional eCRM platforms, each of the plurality of users has to go through these manual save and upload processes to create and track information of a lead referral. These manual processes aggregate the burden associated with eCRM platforms and create at least double entries by each user as each user has to first enter information on a separate spreadsheet or document, for example, to initially collect the lead referrals, and then enter or upload the information into the eCRM platforms.

In some instances, a lead referral obtained by a user may already exist on a conventional eCRM platform. However, conventional eCRM platforms are unable to detect that a lead referral already exists on these conventional eCRM platforms. Therefore, the user has to manually check the information on the eCRM platforms to determine whether the lead referral has previously been uploaded. This can be difficult because a significant number of lead referrals may have been previously stored on the eCRM platforms, and these lead referrals would have to be checked individually by the user. The inability to detect duplicated lead referrals on conventional eCRM platforms adds to the time and effort required to create a lead referral. Moreover, conventional eCRM platforms may include information that may be stale or not up to date as these eCRM platforms are only updated when users upload their lead referrals from their individual spreadsheets or documents into the eCRM platforms.

In other words, conventional eCRM platforms do not allow for real-time uploads of information and do not compare the newly uploaded data to the data already stored in these eCRM platforms to identify matching data (e.g., an record that already exists in the eCRM platforms). Thus, duplicate data can oftentimes be saved in these eCRM platforms, which may cause inconsistent data stored in the eCRM platforms, duplicative data stored in the eCRM platforms, wasted memory space, and confusion for the users.

Furthermore, conventional eCRM platforms are incapable of tracking lead referrals that need follow-up, and lead referrals that have been converted to customers. That is, these known eCRM platforms cannot monitor the status of each lead referral, which results in users having to manually input new information for each lead referral anytime it changes.

Accordingly, a system is needed that provides an automated and streamlined process for electronically creating and tracking lead referrals and information associated with these lead referrals.

BRIEF SUMMARY

The present embodiments described herein may relate to a user interface for real-time data synchronization within a database platform such as an enterprise customer relationship management ("eCRM") platform. These systems and methods are used for managing lead referrals saved within the eCRM platform. A lead referral management ("LRM") system, as described herein, may include a lead referral management ("LRM") computing device in communication with the eCRM platform and one or more data sources. As described herein in further detail, the LRM computing device is configured to provide the user interface for the eCRM platform that enables a user to upload in real-time data to the eCRM platform, perform a check on data already stored on the eCRM platform and the one or more data sources, and identifies any matches of data that is newly uploaded to data already stored in the eCRM platform. The LRM computing device is able to perform these steps in real-time (e.g., in a matter of seconds or even less than a second) for immediate feedback to the user uploading the data.

In one aspect, a lead referral management (LRM) computer system for real-time data synchronization within a database platform. The LRM computer system includes a lead referral management (LRM) computing device in communication with an enterprise customer relationship management (eCRM) platform and one or more data sources. the LRM computing device includes a memory device in communication with at least one processor configured to (i) cause an input page to be displayed on a user computing device for receiving lead referral information, the input page configured to directly access the eCRM platform; (ii) receive, from the user computing device using the input page, lead referral information associated with a lead referral, the lead referral information including an identifier for identifying the lead referral; (iii) in response to receiving the lead referral information, (a) create in real-time a query including the identifier, and (b) initiate in real-time an API call directed to at least the eCRM platform and the one or more data sources, the API call including the query; (iv) cause, in real-time and using the API call, (a) the eCRM platform to compare the identifier to existing lead referral information previously stored on the eCRM platform, and (b) the one or more data sources to compare the identifier to existing lead referral information previously stored on the one or more data sources; and (v) in response to no match being found in the comparison, automatically (a) create a lead referral data entry including the lead referral information, and (b) store the lead referral data entry on the one or more data sources and the eCRM platform. The LRM computer system may include additional, less, or alternate functionality, including that discussed elsewhere herein.

In another aspect, a computer-implemented method for managing lead referrals may be provided. The method may be implemented by a lead referral management ("LRM") system including a lead referral management ("LRM") computing device in communication with an enterprise customer relationship management ("eCRM") platform and a database. The method includes (i) causing an input page to be displayed on a user computing device for receiving lead referral information, the input page configured to directly access the eCRM platform; (ii) receiving, from the user computing device using the input page, lead referral information associated with a lead referral, the lead referral information including an identifier for identifying the lead referral; (iii) in response to receiving the lead referral information, (a) creating in real-time a query including the identifier, and (b) initiating in real-time an API call directed to at least the eCRM platform and the one or more data sources, the API call including the query; (iv) causing, in real-time and using the API call, (a) the eCRM platform to compare the identifier to existing lead referral information previously stored on the eCRM platform, and (b) the one or more data sources to compare the identifier to existing lead referral information previously stored on the one or more data sources; and (v) in response to no match being found in the comparison, automatically (a) creating a lead referral data entry including the lead referral information, and (b) storing the lead referral data entry on the one or more data sources and the eCRM platform. The method may include additional, less, or alternate actions, including those discussed elsewhere herein.

In yet another aspect, at least one non-transitory computer-readable storage media having computer-executable instructions embodied thereon for managing lead referrals is provided. When executed by at least one processor, the computer-executable instructions cause the processor to (i) cause an input page to be displayed on a user computing device for receiving lead referral information, the input page configured to directly access the eCRM platform; (ii) receive, from the user computing device using the input page, lead referral information associated with a lead referral, the lead referral information including an identifier for identifying the lead referral; (iii) in response to receiving the lead referral information, (a) create in real-time a query including the identifier, and (b) initiate in real-time an API call directed to at least the eCRM platform and the one or more data sources, the API call including the query; (iv) cause, in real-time and using the API call, (a) the eCRM platform to compare the identifier to existing lead referral information previously stored on the eCRM platform, and (b) the one or more data sources to compare the identifier to existing lead referral information previously stored on the one or more data sources; and (v) in response to no match being found in the comparison, automatically (a) create a lead referral data entry including the lead referral information, and (b) store the lead referral data entry on the one or more data sources and the eCRM platform. The instructions may direct additional, less, or alternate functionality, including that discussed elsewhere herein.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIGS. 6-16 illustrate a plurality of views of an exemplary graphical user interface displayed on a user computing device when accessing the eCRM platform via the LRM computing device for real-time data synchronization of lead referral data entries in accordance with the processes shown in FIGS. 4 and 5, using the system shown in FIG. 1.

Figure 1:
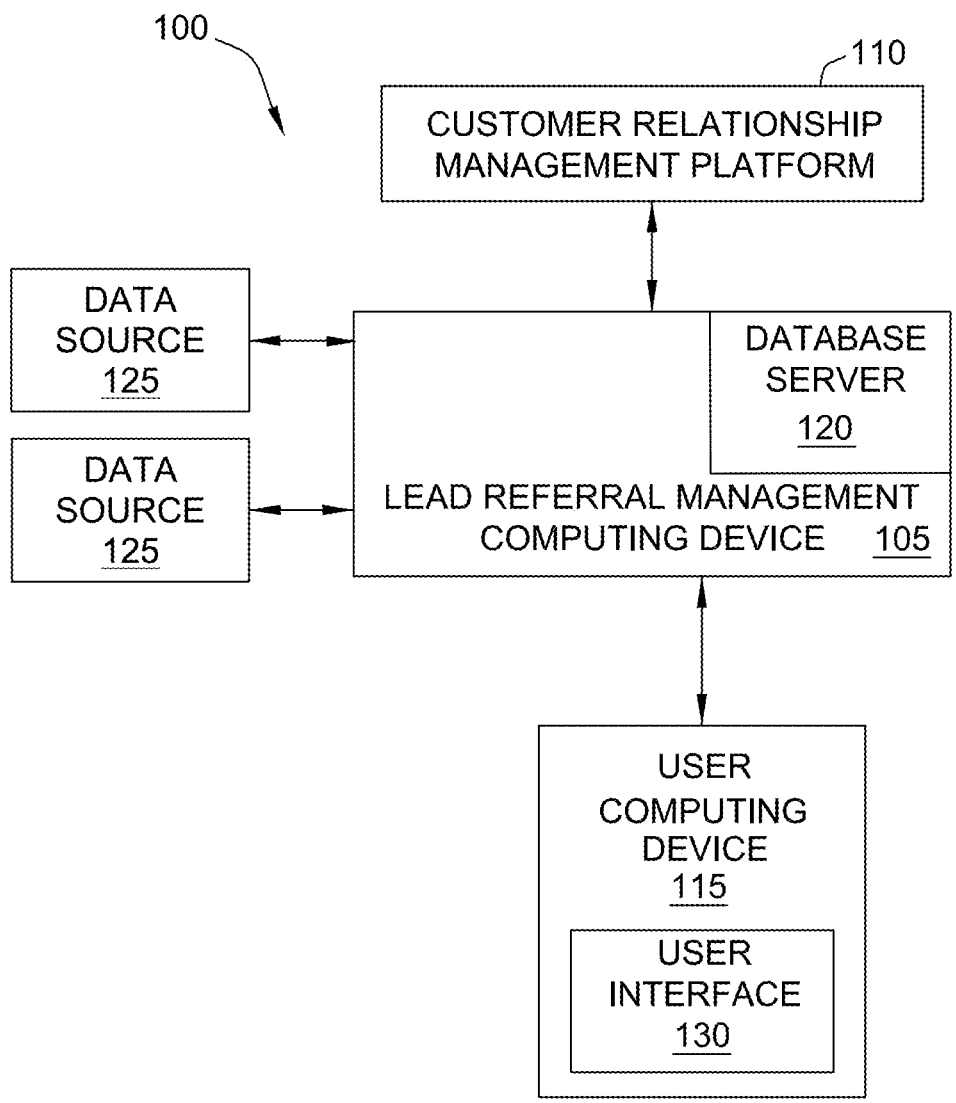
FIG. 1 illustrates an exemplary system for real-time data synchronization of lead referral data entries created and tracked using a lead referral management ("LRM") computing device, an enterprise customer relationship management ("eCRM") platform, and one or more data sources in accordance with at least one embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, a user interface for real-time data synchronization within a database platform, such as an enterprise customer relationship management ("eCRM") platform. These systems and methods are used for creating and tracking in real-time lead referral data entries in the eCRM platform. In an exemplary embodiment, the process is performed by a lead referral management ("LRM") computing device, also known as a lead referral management ("LRM") server. The LRM computing device is in communication with the eCRM platform and one or more data sources. As described herein in further detail, the LRM computing device is configured to provide the user interface for the eCRM platform that enables a user to upload in real-time data to the eCRM platform, perform a check on data already stored on the eCRM platform and the one or more data sources, and identifies any matches of data that is newly uploaded to data already stored in the eCRM platform. The LRM computing device is able to perform these steps in real-time (e.g., in a matter of seconds or even less than a second) for immediate feedback to the user uploading the data.

The LRM computing device is in communication with the eCRM platform that facilitates the organization of customer accounts, customer interactions, customer leads, and other relevant customer data. Examples of eCRM platforms known in the art include SALESFORCE® and MICROSOFT® DYNAMICS®. In some embodiments, the eCRM platform may host the LRM computing device. In other embodiments, the LRM computing device may be in communication with the eCRM platform. The eCRM platform may include a database or data structure. The LRM computing device is also configured to provide data to and receive data from the eCRM platform.

The LRM computing device may also be in communication with one or more data sources (e.g., an internal lead referral database and/or a third-party database) and one or more user computing devices (e.g., a smartphone, tablet, smartwatch, wearable electronic, laptop, desktop, vehicle computing device, or another type of computing device associated with a user). In an exemplary embodiment, the LRM computing device may be configured to provide a graphical user interface ("GUI") or some other interface presented to a user through the user computing device. The LRM computing device may provide the GUI through a web page, web application, software application, or some other means through which the user computing device may access an interface provided by the LRM computing device on the eCRM platform. A user may interact with the LRM computing device through the GUI such that the user is able to input lead referral information for a vendor (e.g., a service and/or goods provider, such as an insurance provider) and selectively access features provided by the LRM computing device, as described in further detail herein.

The LRM computing device may be configured to receive lead referral information from the user via the user computing device and create lead referral data entries on the eCRM platform and/or the one or more data sources. The LRM computing device enables the user to enter lead referrals in real-time onto the eCRM platform by inputting the lead referral information on the GUI. The LRM computing device may be configured to superimpose, overlay, and/or add one or more options in the form of, for example, a button and/or tab onto the eCRM platform, where the button and/or tab may be selected by the user to initiate the creation of a new lead referral on the eCRM platform and/or the one or more data sources. In some embodiments, the LRM computing device may be configured to display on the eCRM platform a lead referral input page (also referred to herein as "input page") as an overlay over a second screen displayed within the eCRM platform, where the overlaid lead referral input page enables the user to input the lead referral information on the GUI. In other embodiments, the LRM computing device may be configured to display on the eCRM platform a lead referral input page as pop-up window within the eCRM platform, where the pop-up window enables the user to input the lead referral information on the GUI. The LRM computing device may also perform a customer check of the lead referral entered by the user before creating the lead referral data entry on the eCRM platform and/or the one or more data sources. The LRM computing device may perform the customer check to determine whether a customer relationship exists between the lead referral and the vendor. That is, the LRM computing device may determine that a customer relationship exists in response to determining that the lead referral is associated with an existing lead/customer included in the eCRM platform. The LRM computing device is able to make these determinations in real-time (e.g., seconds or less than an second) without additional data translations and/or reformatting so a requester of data is able to get results from the eCRM platform much faster than in already known eCRM platforms.

The LRM computing device may be configured to perform the customer check in real-time with respect to the user inputting the lead referral information into the GUI. The LRM computing device performs the customer check by accessing the one or more data sources (e.g., an internal lead referral database and/or a third-party database), and comparing data entered into the GUI, provided by the LRM computing device, to data saved at the one or more data sources for identifying duplicative or related data records. The LRM computing device may be configured to access and parse in real-time the one or more data sources using lead referral input, such as an identifier identifying the lead referral (e.g., a lead referral's phone number, name, address, and the like). The parsing (e.g., accessing and comparing) may be performed in real-time with respect to the lead referral input. The LRM computing device may also be configured to parse the one or more data sources by accessing the one or more data sources using Application Programming Interface ("API") calls. For example, the LRM computing device may initiate an API call to the one or more data sources to perform the customer check (e.g., parse the one or more data sources). The LRM computing device may also interface and/or communicate (e.g., receive data, transmit data, display data, and the like) with the eCRM platform and the one or more data sources via API calls. To be capable of interfacing with the eCRM platform via API calls, the LRM computing device is configured to provide a custom-built page on the eCRM platform to support the API calls. The LRM computing device may further be configured to create a query using the lead referral input, and including the query in the API call. The API call may be configured to run the query against data entries (e.g., existing lead referral data entries) included in the eCRM platform and/or the one or more data sources. The API call may also be configured to retrieve results, if any, from the eCRM platform and/or the one or more data sources upon running the query. The API call may further be configured to translate (e.g., reformat or convert) the results to a format compatible with the GUI provided by the LRM computing device on the eCRM platform, and transmit the translated results to the LRM computing device, which is configured to cause the results to be displayed on the GUI.

In some embodiments, the LRM computing device accesses and parses, via an API call, the one or more data sources simultaneously. If the lead referral is found on at least one of the one or more data sources, the LRM computing device may return/display on the GUI a message indicating that the lead referral is an existing lead/customer (e.g., there is an existing customer relationship between the lead referral and the vendor). If the lead referral is not found on the one or more data sources (e.g., there is no existing customer relationship between the lead referral and the vendor), the LRM computing device may add the lead referral information to the one or more data sources, and return/display on the GUI a message indicating that the lead referral has been added to the system (e.g., the eCRM platform and the one or more data sources). The LRM computing device may add the lead referral information (e.g., create a lead referral data entry on the one or more data sources and the eCRM platform) to the one or more data sources and the eCRM platform simultaneously, thereby enabling the LRM computing device to continuously and automatically synchronize the one or more data sources and the eCRM platform.

In other embodiments, the LRM computing device accesses and parses the one or more data sources consecutively. That is, the LRM computing device may parse (e.g., access and compare data), via an API call, one of the data sources first. Once the parsing of the first data source is complete, the LRM computing device may parse, via the API call, another data source. In one example, the LRM computing device may determine that a lead referral was found on the first data source, and then return/display on the GUI a message indicating that the lead referral is an existing lead/customer. At this point, the customer check is complete, and the LRM computing device stops parsing the one or more data sources (e.g., the LRM computing device does not parse/access a second data source). In another example, the LRM computing device may determine that a lead referral was not found on the first data source, and then proceed to parse/access a second data source (e.g., a third-party data source or an external data source) using the API call. If the lead referral is found on the second data source, the LRM computing device may return/display on the GUI a message indicating that the lead referral is an existing lead/customer. At this point, the customer check is complete. If the lead referral is not found on the second data source, the LRM computing device may add the lead referral information of the lead referral to the first and second data sources, and return/display on the GUI a message indicating that the lead referral has been added to the system (e.g., the eCRM platform and the one or more data sources). The LRM computing device may add the lead referral information (e.g., create a lead referral data entry on the first and second more data sources and the CRM platform) to the eCRM platform and the first and second data sources simultaneously, thereby enabling the LRM computing device to continuously and automatically synchronize the first and second data sources and the eCRM platform. The LRM computing device may use API calls to determine whether a lead referral is associated with an existing lead referral data entry on the eCRM platform and/or the one or more data sources.

In embodiments where the LRM computing device determines there is no existing customer relationship between the lead referral and the vendor (e.g., the lead referral is not associated with an existing lead referral data entry on the eCRM platform and the one or more data sources), the LRM computing device creates a lead referral data entry including the lead referral information on the eCRM platform and the one or more data sources, as discussed above. Upon determining that there is no existing customer relationship between the lead referral and the vendor, the LRM computing device may be configured to cause to display on the GUI in real-time a pop-up window or overlay the message or a notification over a second screen on the GUI indicating to the user that i) a new lead referral data entry will be created by the LRM computing device once receiving confirmation from the user (e.g., receiving electronic acceptance from the user to create the new lead referral data entry) or ii) a new lead referral data entry has been automatically created by the LRM computing device. In cases, where the LRM computing device determines that a customer relationship exists, the LRM computing device causes the GUI to display in real-time the message or a notification, for example, a pop-up window or an overlay notification over a second screen on the GUI, indicating to the user that a customer relationship exists. In some embodiments, the LRM computing device may permit the user to create the lead referral data entry when the existing customer relationship is determined to exist. In other embodiments, the LRM computing device may not permit the user to create the lead referral data entry when the existing customer relationship is determined to exist.

The LRM computing device may also be configured to perform a Do-Not-Solicit ("DNS") check of the lead referral entered by the user. The Telephone Consumer Protection Act ("TCPA") places regulations on the use of telemarketing and other customer solicitation efforts, and failure to comply with these regulations can lead to severe penalties. The LRM computing device performs the DNS check to determine whether the lead referral is listed on a national Do-Not-Solicit ("DNS") registry list. The LRM computing device may perform the DNS check by accessing and parsing, for example, one or more external data sources including a national DNS registry list before the lead referral data entry is created on the eCRM platform and/or the one or more data sources. The LRM computing device may also make API calls to the one or more external data sources to access and/or parse these external data sources. If the LRM computing device finds a match on at least one external data source, the LRM computing device determines that the lead referral is listed on the national DNS registry list, and may display on the GUI instructions including actions that may assist a user of the system to comply with TCPA regulations.

The data sources described herein may include a database or data structure to retrieve and transmit data related to functionalities also described herein. The data sources may be hosted by and/or in communication with the eCRM platform. The data sources may store lead referral information and/or customer information associated with existing lead referral data entries and customer data entries previously created on the eCRM platform and/or the one or more data sources. As discussed above, the LRM computing device may be configured to perform the customer check by retrieving the stored lead referral and customer information and comparing the stored information to the lead referral information entered by the user. The data sources may also store DNS information related to individuals listed on the national DNS registry list. The LRM computing device may also be configured to perform the DNS check by retrieving the DNS information and comparing the lead referral information entered by the user to the DNS information stored on the data sources (e.g., external data sources). If the LRM computing device finds a match between the lead referral information entered by the user and the DNS information stored on the data sources, the LRM computing device is configured to cause to display in real-time on the GUI a pop-up window or overlay notification over a second screen on the GUI indicating to the user that the lead referral may not be contacted via phone call or text message.

Additionally or alternatively, in response to finding the match, the LRM computing device is configured to disable displaying on the GUI contact information (e.g., one or more phone numbers) associated with the lead referral. Once the DNS check is performed, the LRM computing device may be configured to create the lead referral data entry on the eCRM platform and the data sources by transmitting the lead referral information entered by the user to the data sources. In cases where the lead referral information entered by the user matches the DNS information stored in the data sources, the LRM computing device is configured to include a flag on the lead referral data entry indicating that the lead referral is listed on the DNS registry list and may not be contacted via phone call or text message, thereby protecting the user and the vendor from TCPA violations by confirming that the lead referral is on the national do not call list. In some cases, the phone number may be masked on the GUI provided by the LRM computing device when the lead referral is on the DNS registry list so that the user is not provided that information and phone calls cannot be made.

The LRM computing device may also be configured to track conversion statuses of lead referrals on the eCRM platform and the one or more data sources. In cases where the LRM computing device creates a lead referral data entry on the eCRM platform and the one or more data sources, the LRM computing device may assign a conversion status to the new lead referral data entry. In some embodiments, the LRM computing device may assign a conversion status that is inputted by a user. For example, the conversion status may be included in the lead referral information received by the LRM computing device. In other embodiments, the LRM computing device may automatically assign a pre-defined conversion status to the new lead referral data entry. The conversion status assigned by the LRM computing device may represent the potential opportunity of the lead referral to be converted to a customer. The LRM computing device may further be configured to determine an opportunity value of the conversion status assigned to the lead referral based on the potential opportunity of the lead referral to be converted to a customer. In some embodiments, the determined opportunity value may be one of a high opportunity value and a low opportunity value.

The LRM computing device may further be configured to automatically update the conversion statuses of lead referrals on the eCRM platform and the one or more data sources. The LRM computing device may perform this update simultaneously on the eCRM platform and the one or more data sources, thereby enabling continued and automatic synchronization of the eCRM platform and the one or more data sources. After a lead referral data entry is created on the eCRM platform and the one or more data sources, the lead referral data entry may transition from one conversion status to another. In one example, a lead referral data entry may be converted to a prospective customer. In another example, a lead referral data entry may be converted to a customer. For each lead referral data entry on the eCRM platform and the one or more data sources, the LRM computing device may determine that the conversion status of the lead referral data entry has changed. In some embodiments, the LRM computing device may determine that the conversion status has changed based on user input of lead referral information which includes a new conversion status of the lead referral data entry. In other embodiments, the LRM computing device may determine, after a predefined time (e.g., a number of days) of no conversion status activity or updates, that the lead referral was unsuccessfully converted, and automatically purge the lead referral data entry from the eCRM platform and the one or more data sources.

In some embodiments, the LRM computing device may continuously parse or access the eCRM platform and/or the one or more data sources to determine whether the conversion status of lead referral data entries stored in the one or more data sources has changed. For example, the eCRM platform and/or the one or more data sources may include or interface with an Opportunity database table or Opportunity object, which includes up-to-date information for each lead referral data entry, such as the conversion status. The LRM computing device may automatically track in real-time the conversion status of each lead referral by continuously parsing or accessing the Opportunity object. The LRM computing device may parse or access the Opportunity using API calls. The LRM computing device may also determine when the Opportunity object indicates an updated conversion status of any lead referral data entry. The LRM computing device may further update in real-time the conversion status of a lead referral data entry on the eCRM platform and the one or more data sources when the LRM computing device determines the Opportunity object indicates an updated conversion status for the lead referral data entry. The LRM computing device may update the conversion status of the lead referral data entry by assigning the determined updated conversion status to the lead referral data entry, thereby replacing the conversion status previously assigned to the lead referral data entry.

The LRM computing device may also be configured to periodically and automatically prune the eCRM platform and the one or more data sources to purge stale customer information and/or lead referral information. For example, the LRM computing device may purge a customer data entry and/or a lead referral data entry from the eCRM platform and/or one or more data sources at and/or after a predefined time, for example, a number of days. For example, when a customer data entry indicates that a customer no longer has a relationship with the vendor (e.g., an ex-customer), the LRM computing device may purge the customer data entry from the eCRM platform and/or the one or more data sources at a predefined time after the customer data entry has indicated that the customer no longer has a relationship with the vendor. By doing so, the LRM computing device may add the ex-customer as a new lead referral (e.g., create a new lead referral data entry for the ex-customer) after the customer data entry has been purged. The LRM computing device may also purge lead referral data entries after no activity has occurred with the lead referral data entry for a predefined time.

As used herein, the term "real-time" refers to at least one of the time of occurrence of the associated events, the time of measurement and collection of predetermined data, the time to process the data, and the time of a system response to the events and the environment of the events. In the examples described herein, these activities and events occur substantially instantaneously.

At least one advantage of this system is that the lead referral data entry is created simultaneously on the eCRM platform and the one or more data sources in real-time. The system captures the lead referral information directly on the eCRM platform and automatically determines whether the lead referral already exists on the eCRM platform and/or the one or more data sources. This enables the eCRM platform and the one or more data sources to efficiently crate a new lead referral data entry and store new lead referral information associated with the new lead referral data entry as soon as the lead referral information is obtained from a referrer. The system also instantly centralizes the lead referral information and provides instant access to the lead referral information stored on the eCRM platform and the one or more data sources. The system also automatically and continuously updates lead referral information on the eCRM platform and the one or more data sources to facilitate smarter and more efficient tracking of lead referrals.

At least one technical problem addressed by this system include: (i) inefficient conventional enterprise customer relationship management ("eCRM") platforms which do not interface with external data sources and cannot receive data records, such as lead referral information in real-time; (ii) lack of a system for managing data records (e.g., lead referral data entries) that is enabled to, for example (a) create lead referral data entries in real-time on an eCRM platform and other data sources in communication with the eCRM platform, (b) check in real-time that a new lead referral does not have an existing relationship with a vendor (e.g., the new referral is not an existing customer, prospective customer (e.g., a current lead referral), or recent ex-customer of the vendor or an individual with whom the vendor is in business), and (c) check in real-time that a new lead referral is not currently listed on a Do-Not-Solicit ("DNS") registry list; (iii) lack of a centralized system for efficiently creating and tracking in real-time lead referral data entries on an eCRM platform associated with a plurality of users; (iv) lack of capability on an eCRM platform to continuously check for updates of lead referral information, such as a conversion status of the lead referral, and automatically update information associated with the lead referral on the eCRM platform; and/or (v) lack of automatically prune the eCRM platform and the data sources to purge stale data (e.g., lead referral unsuccessfully converted to customer and/or ex-customers).

One technical effect of the systems and processes described herein may be achieved by performing at least one of the following steps: (i) causing an input page to be displayed on a user interface of a user computing device for receiving a plurality of lead referral information for a vendor, wherein the input page is configured to directly access the eCRM platform; (ii) receiving, from the user computing device using the input page, lead referral information associated with a lead referral, wherein the lead referral information includes an identifier for identifying the lead referral; (iii) in response to receiving the lead referral information, creating in real-time a query including the identifier, and initiating in real-time an API call directed to at least the eCRM platform and the one or more data sources, the API call including the query; (iv) causing, in real-time and using the API call, the one or more data sources and the eCRM platform to compare the identifier to existing lead referral information previously stored on the eCRM platform and the one or more data sources; (v) causing, in real-time and using the API call, (a) the eCRM platform to compare the identifier to existing lead referral information previously stored on the eCRM platform, and (b) the one or more data sources to compare the identifier to existing lead referral information previously stored on the one or more data sources; and (vi) in response to no match being found in the comparison, automatically (a) creating a lead referral data entry including the lead referral information, and (b) storing the lead referral data entry on the one or more data sources and the eCRM platform.

Another technical effect of the systems and processes described herein may be achieved by performing at least one of the following steps: (i) causing an input page to be displayed on a user interface of a user computing device for receiving a plurality of lead referral information for a vendor, wherein the input page is configured to directly access the eCRM platform; (ii) receiving, from the user computing device using the input page, lead referral information associated with a lead referral, wherein the lead referral information includes an identifier for identifying the lead referral; (iii) in response to receiving the lead referral information, creating a query including the identifier, and initiating in real-time an API call directed to at least the eCRM platform and the one or more data sources, the API call including the query; (iv) causing, in real-time and using the API call, the one or more data sources and the eCRM platform to compare the identifier to existing lead referral information previously stored on the eCRM platform and the one or more data sources; (v) causing, in real-time and using the API call, (a) the eCRM platform to compare the identifier to existing lead referral information previously stored on the eCRM platform, and (b) the one or more data sources to compare the identifier to existing lead referral information previously stored on the one or more data sources; (vi) in response to a match being found in the comparison, determining that a customer relationship exists between the lead referral and a vendor; and (v) causing a message or a notification to be displayed, as a pop-up window or an overlay notification over a second screen on the user interface of the user computing device, where in the message or notification indicates that the customer relationship exists.

As a result, smart and efficient management of lead referrals may be facilitated by real-time, direct access of an eCRM through an unconventional user interface that enables said access and parsing of data before the lead referral data is saved in the eCRM platform.

The technical effect achieved by this system may be at least one of: (i) facilitating smart and efficient managing of lead referrals on legacy enterprise customer relationship management ("eCRM") platforms; (ii) providing a comprehensive lead referral management system enabled to create in real-time lead referral data entries onto an eCRM platform and data sources in communication with the eCRM platform by, for example, (a) capturing lead referral information associated with a new lead referral from a user on an input page configured to directly access the eCRM platform, (b) parsing or accessing, in real-time, the eCRM platform and the data sources using an API call including a query that includes at least some of the lead referral information, (c) determining, in real-time and using the API call, whether the new lead referral has an existing relationship with a vendor (e.g., determining whether the new referral is an existing customer, prospective customer (e.g., a current lead referral), or recent ex-customer of the vendor or an individual with whom the vendor is in business) in response to parsing or accessing the eCRM platform and the data sources, (d) determining, in real-time, whether the new lead referral is currently listed on a Do-Not-Solicit ("DNS") registry list in response to parsing or accessing, using the API call, one or more data sources including data associated with the DNS registry list, and (e) if no existing relationship exists, creating, in real-time, a new lead referral data entry on the eCRM platform and the data sources; (iii) providing a comprehensive lead referral management system configured to monitor and update, in real-time, the status of lead referral data entries on the eCRM platform and the data sources by, for example, (a) assigning a conversion status to each lead referral data entry on the eCRM platform and the data sources upon creating the new lead referral data entry, (b) continuously checking for conversion status updates for each of the lead referral data entries on the eCRM platform and the data sources, and (c) assigning, if the conversion status of a lead referral changes, an updated conversion status to a lead referral data entry associated with the lead referral; and/or (iv) providing a comprehensive lead referral management system that facilitates visualization of tracking of lead referrals by, for example, (a) creating account pages for each lead referral data entry and lead referral summary windows configured to display lead referral information of lead referrals associated with a select referrer on the eCRM platform, and (b) continuously updating the information on the account pages and lead referral summary windows using updated information stored on the eCRM platform and the data sources, where the information may have been stored simultaneously on the eCRM platform and the data sources, thereby enabling automatic synchronization of the eCRM platform and the data sources.

Exemplary Lead Referral Management System

FIG. 1 illustrates an exemplary system 100 that may be used for real-time data synchronization of lead referral data entries created and tracked by system 100. System 100 may include a lead referral management ("LRM") computing device 105, which may be in communication with an enterprise customer relationship management ("eCRM") platform 110. In some embodiments, LRM computing device 105 is a component of eCRM platform 110, while in others, LRM computing device 105 is separate from eCRM platform 110. In the exemplary embodiment, LRM computing device is in further communication with user computing devices 115. LRM computing device 105 is also in communication with data sources 125. In some embodiments, a database server 120 is a component of eCRM platform 110. In other embodiments, database server 120 is separate from eCRM platform 110. In yet other embodiments, database server 120 is separate from eCRM platform 110 and is a component of LRM computing device 105. In some embodiments, system 100 may include a plurality of LRM computing devices 105, eCRM platforms 110, user computing devices 115, and/or database servers 120.

In the exemplary embodiment, LRM computing device 105 is configured to create, store, and update lead referral data entries on eCRM platform 110 and data sources 125. LRM computing device 105 may receive lead referral information from user computing devices 115 from a user via a user interface 130 (also referred to herein as "GUI" 130). For example, the user may download a computer application of eCRM platform 110 to a client device associated with the user (e.g., a user computing device 115) and input lead referral information into the computer application via GUI 130 to create and/or update a lead referral data entry as soon as the user obtains the lead referral information, e.g., in real-time. The user may also access a website of eCRM platform 110 using a web browser, and input lead referral information into the website via GUI 130 to create and/or update a lead referral data entry in real-time. The lead referral information may include one or more identifiers identifying the lead referral (e.g., lead referral's phone number, name, home address, and the like), the name of a referrer of the lead referral, the relationship between the lead referral and the referrer, and/or other information associated with the lead referral. LRM computing device 105 may store the lead referral information on data sources 125 and eCRM platform 110, create, in real-time, a lead referral data entry associated with the lead referral on data sources 125 and eCRM platform 110, and/or update a lead referral data entry on data sources 125 and/or eCRM platform 110.

Lead referral information may also include a conversion status of a lead referral. The conversion status may be assigned by LRM computing device 105. LRM computing device 105 may assign a user-defined conversion status, or may automatically assign a pre-defined conversion status. For example, LRM computing device 105 may receive from a user a conversion status of a lead referral when the user inputs lead referral information to create and/or update a lead referral data entry associated with the lead referral. In another example, LRM computing device 105 may automatically assign a conversion status to a lead referral upon creating and/or updating the lead referral data entry. The conversion status may represent an opportunity value of the lead referral. The opportunity value may be defined as the potential opportunity of the user to convert the lead referral to a customer of the user. In the exemplary embodiment, the conversion status may represent one of a high opportunity value and a low opportunity value. The high opportunity value may reflect an open potential for the user to convert the lead referral to a customer. The low opportunity value may reflect a closed potential for the user to convert the lead referral to a customer. In the exemplary embodiment, LRM computing device 105 may automatically assign an Open status to a lead referral upon creating the lead referral data entry. An Open status may indicate that the lead referral has not yet been converted to a customer and there is still an open potential for the lead referral to be converted to a customer (e.g., represents a high opportunity value).

LRM computing device 105 may also be configured to perform a customer check and determine whether a customer relationship exists between the lead referral and the vendor. LRM computing device 105 may be configured to perform the customer check in real-time with respect to the user inputting the lead referral information into GUI 130. LRM computing device 105 performs the customer check by parsing or accessing one or more data sources 125 (e.g., an internal lead referral database and/or a third-party database). LRM computing device 105 may be configured to parse or access in real-time one or more data sources 125 using Application Programming Interface ("API") calls. The LRM computing device 105 may also be configured to include in the API calls a query created by LRM computing device 105, where the created query may include at least some of the lead referral information (e.g., an identifier identifying the lead referral, such as a lead referral's phone number, name, address, and the like). The parsing may be performed in real-time with respect to receiving the lead referral information. In one example, LRM computing device 105 may initiate an API call to one or more data sources 125 to perform the customer check (e.g., parse one or more data sources 125). LRM computing device 105 may also interface and/or communicate (e.g., receive data, transmit data, display data, and the like) with eCRM platform 110 and one or more data sources 125 via API calls. To be capable of interfacing with eCRM platform 110 via API calls, LRM computing device 105 is configured to provide a custom-built page on eCRM platform 110 to support the API calls.

In some embodiments, LRM computing device 105 may initiate the customer check by parsing or accessing one or more data sources 125 simultaneously. If the lead referral is found on at least one of one or more data sources 125, LRM computing device 105 may return/display on GUI 130 a message indicating that the lead referral is an existing lead/customer (e.g., there is an existing customer relationship between the lead referral and the vendor). If the lead referral is not found on eCRM platform 110 and one or more data sources 125 (e.g., there is no existing customer relationship between the lead referral and the vendor), LRM computing device 105 may create, on one or more data sources 125 and eCRM platform 110, a new lead referral entry including the lead referral information, and return/display on GUI 130 a message indicating that the lead referral has been added to system 100. LRM computing device 105 may add the lead referral information (e.g., create a lead referral data entry on one or more data sources 125 and eCRM platform 110) to one or more data sources 125 and eCRM platform 110 simultaneously, thereby enabling LRM computing device 105 to continuously and automatically synchronize one or more data sources 125 and eCRM platform 110.

In other embodiments, LRM computing device 105 parses or accesses one or more data sources 125 consecutively. That is, LRM computing device 105 may parse first one of data sources 125. Once the parsing of first data source 125 is complete, LRM computing device 105 may parse another data source 125. In one example, LRM computing device 105 may determine that a lead referral was found on first data source 125, and then return/display on GUI 130 a message indicating that the lead referral is an existing lead/customer. At this point, the customer check is complete, and LRM computing device 105 stops parsing or accessing one or more data sources 125 (e.g., LRM computing device 105 does not parse a second data source 125). In another example, LRM computing device 105 may determine that a lead referral was not found on first data source 125, and then proceed to parse a second data source 125 (e.g., a third-party data source or an external data source). If the lead referral is found on second data source 125, LRM computing device 105 may return/display on GUI 130 a message indicating that the lead referral is an existing lead/customer. At this point, the customer check is complete. If the lead referral is not found on second data source 125, LRM computing device 105 may create, on first and second data sources 125 and eCRM platform 110, a new lead referral entry including the lead referral information, and return/display on GUI 130 a message indicating that the lead referral has been added to system 100. LRM computing device 105 may add the lead referral information (e.g., create a lead referral data entry on first and second more data sources 125 and eCRM platform 110) to eCRM platform 110 and first and second data sources 125 simultaneously, thereby enabling LRM computing device 105 to continuously and automatically synchronize first and second data sources 125 and eCRM platform 110.

In embodiments where LRM computing device 105 determines there is no existing customer relationship between the lead referral and the vendor, LRM computing device 105 creates a lead referral data entry including the lead referral information on eCRM platform 110 and one or more data sources 125, as discussed above. Upon determining that there is no existing customer relationship between the lead referral and the vendor, LRM computing device 105 may be configured to cause to display on GUI 130 a pop-up window or overlay the message or a notification over a second screen on GUI 130 indicating to the user that i) a new lead data entry will be created by LRM computing device 105 once receiving confirmation from the user (e.g., receiving electronic acceptance from the user to create the new lead referral data entry) or ii) a new lead referral data entry has been automatically created by LRM computing device 105. In cases, where LRM computing device 105 determines that a customer relationship exists, LRM computing device 105 causes GUI 130 to display the message or a notification, for example, a pop-up window or an overlay notification over a second screen on GUI 130, indicating to the user that a customer relationship exists. In some embodiments, LRM computing device 105 may permit the user to create the lead referral data entry when the existing customer relationship is determined to exist. In other embodiments, LRM computing device 105 may not permit the user to create the lead referral data entry when the existing customer relationship is determined to exist.

LRM computing device 105 may further be configured to perform a Do-Not-Solicit ("DNS") check and determine whether a lead referral is associated with an individual on a national Do-Not-Solicit ("DNS") registry list. For example, LRM computing device 105 may perform the DNS check by accessing and parsing, for example, one or more external data sources (not shown) including a national DNS registry list before the lead referral data entry is created on eCRM platform 110 and/or one or more data sources 125. LRM computing device 105 may also make API calls to the one or more external data sources to access and/or parse these external data sources. If LRM computing device 105 finds a match on at least one external data source, LRM computing device 105 determines that the lead referral is listed on the national DNS registry list, and may display on GUI 130 instructions including actions that may assist a user of the system to comply with regulations established by the Telephone Consumer Protection Act ("TCPA").

In the exemplary embodiment, LRM computing device 105 performs the DNS check automatically upon receiving lead referral information from the user. LRM computing device 105 may also perform the DNS check simultaneously with the customer check. Further, once LRM computing device 105 determines that the lead referral information is associated with an individual on the national DNS registry list, LRM computing device 105 may include a flag on the lead referral data entry indicating that the lead referral is listed on the DNS registry list and may not be contacted via phone call or text message, thereby protecting the user and the vendor from TCPA violations by confirming that the lead referral is on the national do not call list.

In the exemplary embodiment, LRM computing device 105 centralizes lead referral information received in real-time from user computing devices 115 associated with a plurality of users. For example, LRM computing device 105 may receive lead referral information from one of the user computing devices 115 associated with one of the plurality of users. LRM computing device 105 may then create a lead referral data entry on eCRM platform 110 and one or more data sources 125. For example, LRM computing device 105 may store the lead referral information received from the user on eCRM platform 110 and data sources 125, and generate, on eCRM platform 110, an account page associated with the created lead referral data entry, where the account page displays the lead referral information received from the user. Each of the plurality of users then has instant access to the lead referral data entry created on system 100 via user computing devices 115. LRM computing device 105 also has instant access to the lead referral information to use, for example, in customer checks performed against lead referral information subsequently entered by another one of the plurality of users.

LRM computing device 105 may further be configured to continuously update lead referral data entries stored and created on eCRM platform 110 and data sources 125. In the exemplary embodiment, LRM computing device 105 is configured to continuously check and update the conversion status of lead referrals on system 100. For example, LRM computing device 105 may receive an updated conversion status selected by a user for a lead referral data entry previously created on system 100 and update the conversion status of the lead referral accordingly. In another example, LRM computing device 105 may automatically update the conversion status of a lead referral based on updated information stored on eCRM platform 110 and/or data sources 125. LRM computing device 105 may be in communication with eCRM platform 110 and data sources 125 to continuously determine whether the conversion status of lead referrals stored in data sources 125 has changed. Data sources 125 and/or eCRM platform may include or interface with an Opportunity database table or Opportunity object (not shown), which includes up-to-date information for each lead referral data entry, such as the conversion status. LRM computing device 105 may track in real-time the conversion status of each lead referral by continuously parsing the Opportunity object. LRM computing device 105 may parse the Opportunity table by initiating API calls directed to the Opportunity table. LRM computing device 105 may also determine when the Opportunity object includes an updated conversion status of any one lead referral. LRM computing device 105 may further update the conversion status of a lead referral data entry on eCRM platform 110 and/or data sources 125 in real-time when the LRM computing device determines the Opportunity object indicates an updated conversion status for the lead referral associated with the lead referral data entry. LRM computing device 105 may update the conversion status of the lead referral by assigning the determined updated conversion status to the lead referral data entry of the lead referral, thereby replacing the conversion status previously assigned to the lead referral.

Exemplary User Computing Device

Figure 2:
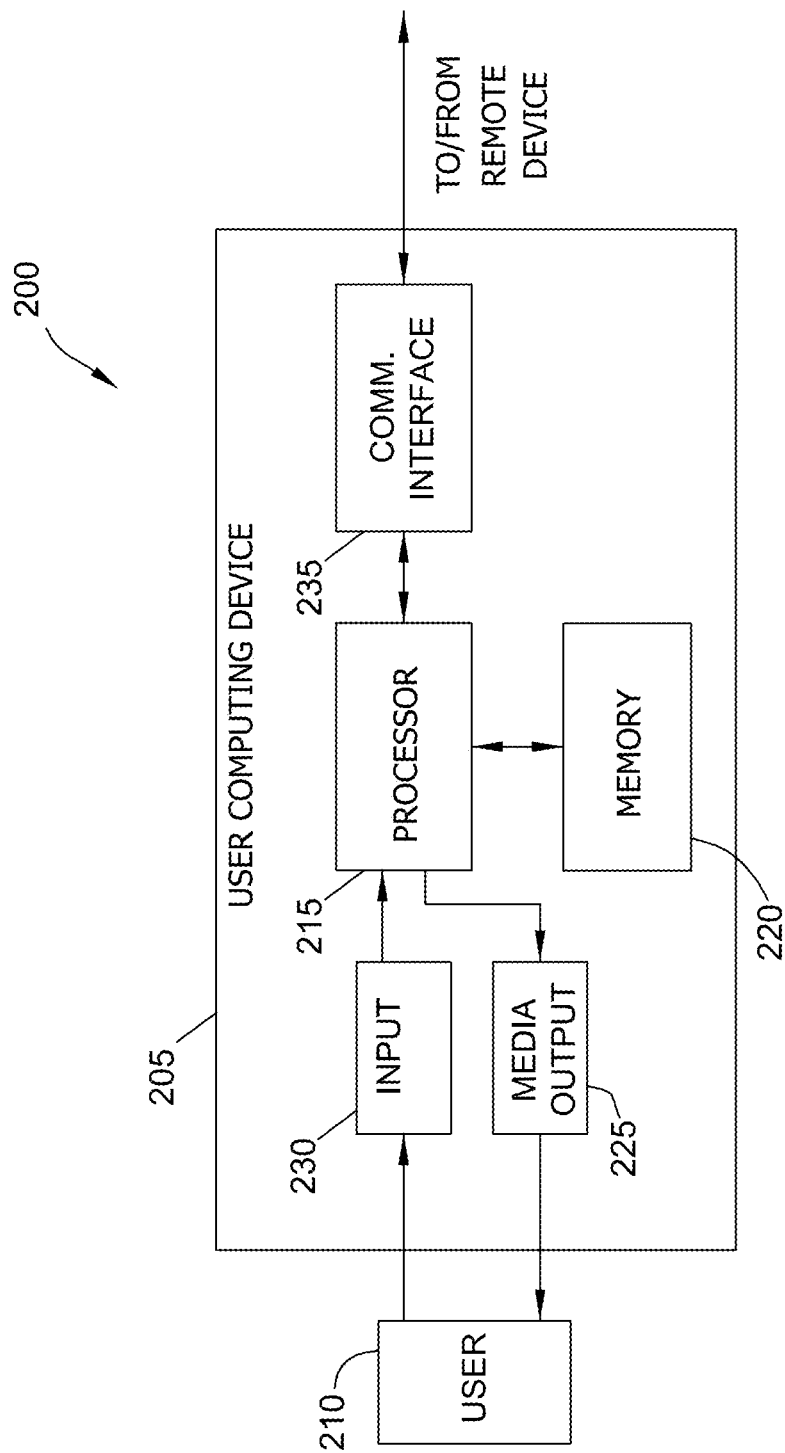
FIG. 2 illustrates an example configuration of user computing device used in the system shown in FIG. 1, in accordance with one example of the present disclosure.

FIG. 2 illustrates an exemplary configuration 200 of an exemplary user computing device 205. In some embodiments, user computing device 205 may be in communication with a lead referral management ("LRM") computing device (such as LRM computing device 105, shown in FIG. 1) and an enterprise customer relationship management ("eCRM") platform (such as eCRM platform 110, shown in FIG. 1). User computing device 205 may be representative of, but is not limited to user computing devices 115 (shown in FIG. 1). For example, user computing device 205 may be a smartphone, tablet, smartwatch, wearable electronic, laptop, desktop, vehicle computing device, or another type of computing device associated with a user.

User computing device 205 may be operated by a user 210 (e.g., a user of system 100, shown in FIG. 1). User computing device 205 may receive input from user 210 via an input device 230. User computing device 205 includes a processor 215 for executing instructions. In some embodiments, executable instructions may be stored in a memory area 220. Processor 215 may include one or more processing units (e.g., in a multi-core configuration). Memory area 220 may be any device allowing information such as executable instructions and/or transaction data to be stored and retrieved. Memory area 220 may include one or more computer-readable media.

User computing device 205 may also include at least one media output component 225 for presenting information to user 210. Media output component 225 may be any component capable of conveying information to user 210. In some embodiments, media output component 225 may include an output adapter (not shown), such as a video adapter and/or an audio adapter. An output adapter may be operatively coupled to processor 215 and operatively coupleable to an output device, such as a display device (e.g., a cathode ray tube (CRT), liquid crystal display (LCD), light emitting diode (LED) display, or "electronic ink" display) or an audio output device (e.g., a speaker or headphones).

In some embodiments, media output component 225 may be configured to present a graphical user interface ("GUI") (e.g., a web browser and/or a client application) to user 210. The GUI may be similar to GUI 130 shown in FIG. 1.

In some embodiments, user computing device 205 may include input device 230 for receiving input from user 210. User 210 may utilize input device 230 to, without limitation, interact with system 100 (e.g., using an app), LRM computing device 105, eCRM platform 110, or user computing devices 115 (shown in FIG. 1). Input device 230 may include, for example, a keyboard, a pointing device, a mouse, a stylus, and/or a touch sensitive panel (e.g., a touch pad or a touch screen). A single component, such as a touch screen, may function as both an output device of media output component 225 and input device 230. User computing device 205 may further include at least one sensor, including, for example, a gyroscope, an accelerometer, a position detector, a biometric input device, a telematics data collection device, and/or an audio input device. In some embodiments, at least some data collected by user computing device 205 may be transmitted to LRM computing device 105 and eCRM platform 110. In the exemplary embodiment, data collected by user computing device 205 may be included in lead referral data entries created on system 100 using LRM computing device 105.

User computing device 205 may also include a communication interface 235, communicatively coupled to any of LRM computing device 105, eCRM platform 110, user computing devices 115, and/or one or more data sources 125 (shown in FIG. 1). Communication interface 235 may include, for example, a wired or wireless network adapter and/or a wireless data transceiver for use with a mobile telecommunications network.

Stored in memory area 220 may be, for example, computer-readable instructions for providing a GUI to user 210 via media output component 225 and, optionally, receiving and processing input from input device 230. The GUI may include, among other possibilities, a web browser and/or a client application. Web browsers enable users, such as user 210, to display and interact with media and other information typically embedded on a web page or a website hosted by LRM computing device 105, eCRM platform 110 and/or user computing device 205. A client application may allow user 210 to interact with, for example, any of LRM computing device 105, eCRM platform 110, and user computing devices 115. For example, instructions may be stored by a cloud service and the output of the execution of the instructions sent to the media output component 225.

Exemplary Server Device

Figure 3:
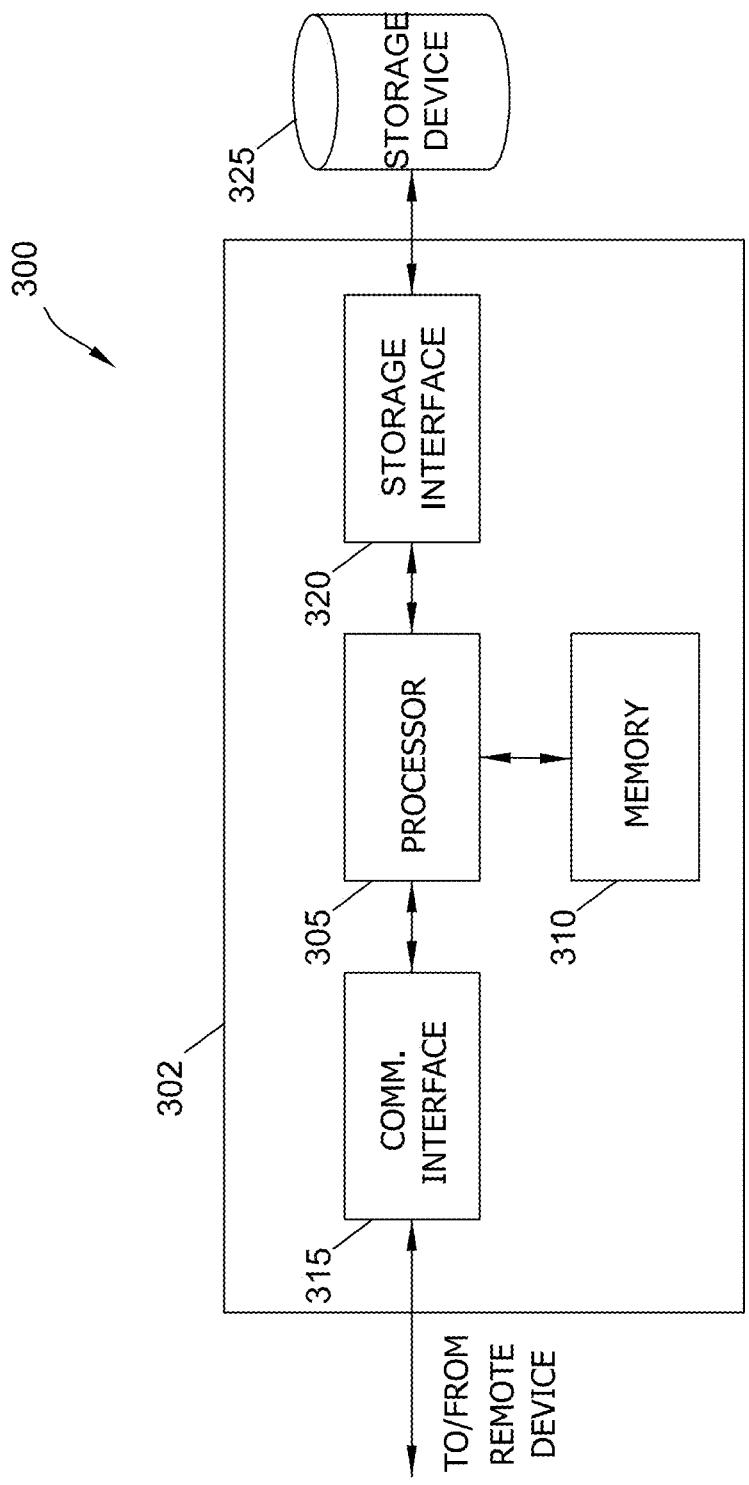
FIG. 3 illustrates an example configuration of a server computing device used in the system shown in FIG. 1, in accordance with one example of the present disclosure.

FIG. 3 depicts an exemplary configuration 300 of an exemplary server computing device 302, in accordance with one embodiment of the present disclosure. Server computing device 302 may include, but is not limited to, LRM computing device 105 and/or eCRM platform 110 (both shown in FIG. 1). Server computing device 302 may include a processor 305 for executing instructions. Instructions may be stored in a memory area 310. Processor 305 may include one or more processing units (e.g., in a multi-core configuration).

Processor 305 may be operatively coupled to a communication interface 315 such that server computing device 302 may be capable of communicating with a remote device such as another server computing device 302 or a user computing device, such as user computing device 205 (shown in FIG. 2). For example, communication interface 315 may receive requests from or transmit requests to user computing device 205 via the Internet.

Processor 305 may also be operatively coupled to at least one storage device 325 that may be similar to one or more data sources 125 (shown in FIG. 1). Storage device 325 may be any computer-operated hardware suitable for storing and/or retrieving data, such as, but not limited to, data associated with data sources 125. In some embodiments, storage device 325 may be integrated in server computing device 302. For example, server computing device 302 may include one or more hard disk drives as storage device 325. In other embodiments, storage device 325 may be external to server computing device 302 and may be accessed by a plurality of server computing devices 302. For example, storage device 325 may include a storage area network (SAN), a network attached storage (NAS) system, and/or multiple storage units such as hard disks and/or solid state disks in a redundant array of inexpensive disks (RAID) configuration.

In some embodiments, processor 305 may be operatively coupled to storage device 325 via a storage interface 320. Storage interface 320 may be any component capable of providing processor 305 with access to storage device 325. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 325.

Figure 4:
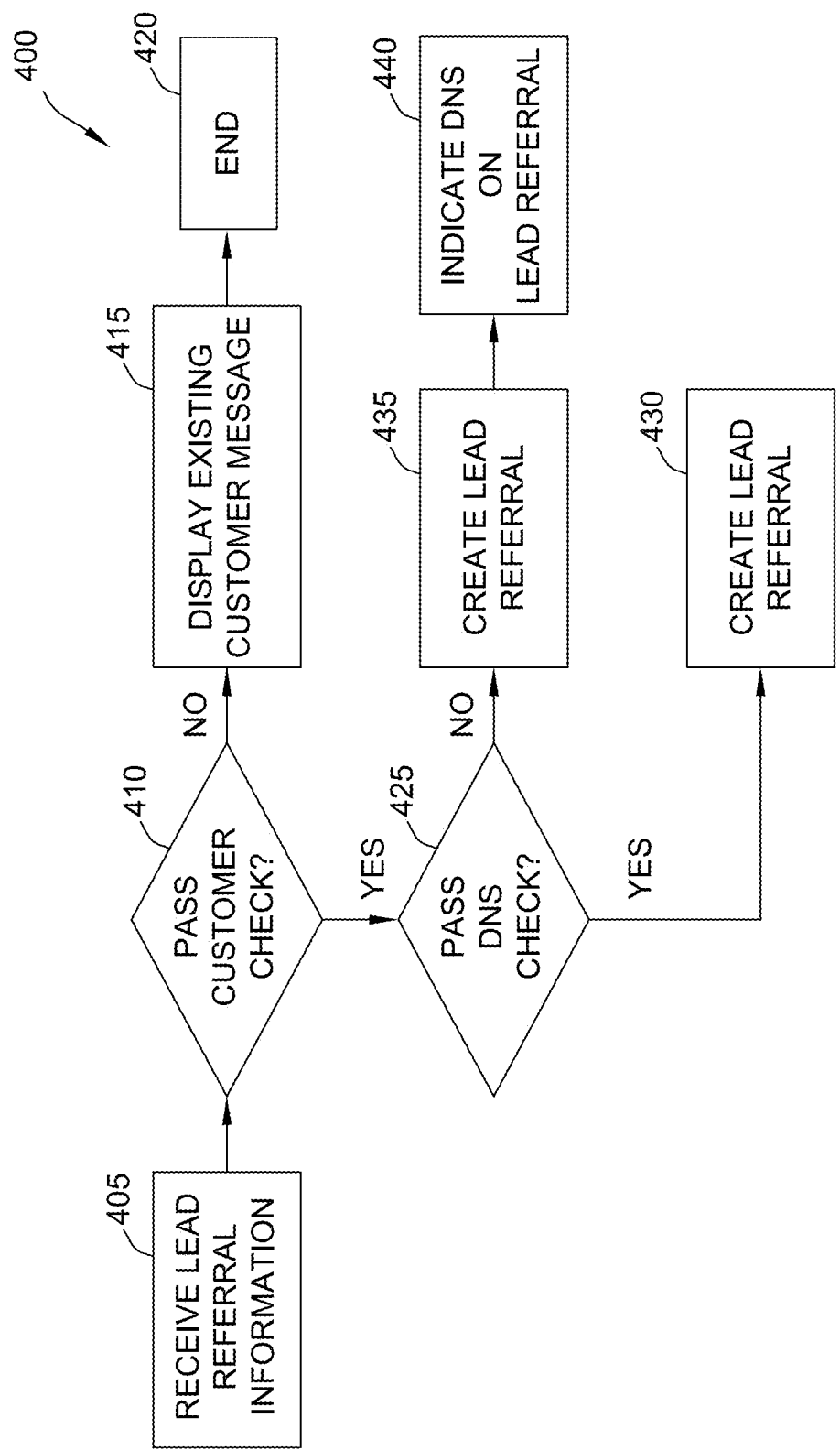
FIG. 4 illustrates a process for real-time creation of lead referral data entries using the system shown in FIG. 1.

Processor 305 executes computer-executable instructions for implementing aspects of the disclosure. In some embodiments, processor 305 may be transformed into a special purpose microprocessor by executing computer-executable instructions or by otherwise being programmed Exemplary Process for Real-Time Creation of Lead Referral Data Entries FIG. 4 depicts a flow chart illustrating an exemplary process 400 for real-time creation of lead referral data entries on an enterprise customer relationship management ("eCRM") platform, such as eCRM platform 110, and one or more data sources, such as data sources 125 (both shown in FIG. 1). In the exemplary embodiment, process 400 may be implemented by a computer system such as system 100 (shown in FIG. 1), and more specifically, by LRM computing device 105 (shown in FIG. 1).

Process 400 may include receiving 405 lead referral information associated with a lead referral from a user of a vendor. The user may input the lead referral information on a user computing device associated with the user, such as inputting information on GUI 130 on user computing device 115 (both shown in FIG. 1), as discussed above. In the exemplary embodiment, the user may utilize an input page, displayed on GUI 130 on user computing device 115, to input the lead referral information on user computing device 115. This enables LRM computing device 105 to receive 405 the lead referral information from user computing device 115 in real-time. For example, LRM computing device 105 may be configured to superimpose, overlay, and/or add one or more options in the form of, for example, a button and/or tab onto eCRM platform 110, where the button and/or tab may be selected by the user to initiate a customer check that enables determining whether to create a new lead referral data entry on system 100. In some embodiments, LRM computing device 105 may be configured to display on eCRM platform 110 a lead referral input page as an overlay over a second screen displayed within eCRM platform 110, where the overlaid lead referral input page enables the user to input the lead referral information on GUI 130. In other embodiments, LRM computing device 105 may be configured to display on eCRM platform 110 a lead referral input page as a pop-up window within eCRM platform 110, where the pop-up window enables the user to input the lead referral information on GUI 130. The lead referral information may be obtained by the user from a referrer. The referrer may have a relationship with the lead referral, such as, for example, a familial relationship or friendship. The lead referral information may include, for example, the name of the lead referral. The lead referral information may also include contact information of the lead referral (e.g. home address, phone number). The lead referral information may also include the relationship between the lead referral and the referrer (e.g. sibling, parent, friend, neighbor, and/or the like).

In the exemplary embodiment, LRM computing device 105 may also be configured to determine if the lead referral passes 410 the customer check. The customer check may determine whether the lead referral information matches information stored in data sources 125 in communication with LRM computing device 105. In one example, LRM computing device 105 may retrieve the information stored in eCRM platform 110 and/or data sources 125 using an API call. The information stored in eCRM platform 110 and/or data sources 125 may include a list of a plurality of individuals and the contact information associated with each individual. The information stored in eCRM platform 110 and data sources 125 may also include a customer status of the individual, which may indicate an existing customer relationship between each of the plurality of individuals and the vendor. The customer status may be a data point stored in eCRM platform 110 and data sources 125 associated with each of the plurality of individuals. For example, eCRM platform 110 and/or data sources 125 may include or interface with one or more Customer database tables containing at least the name of each of a plurality of individuals and a customer status data point defining the customer status of each of the plurality of individuals. For example, the customer status data point for each of the plurality of individuals may indicate the individual is a non-customer, an existing customer of the vendor, an existing customer of a third person in business with the vendor, an existing prospective customer of the vendor, a customer of the vendor within a pre-defined time period, and/or a customer of a third person in business with the vendor within a pre-defined time period. The pre-defined time period may be, for example, measured in a number of days and/or months. The customer status may also be defined by the existence of at least a name of an individual stored in eCRM platform 110 and/or data sources 125. For example, eCRM platform 110 and/or data sources 125 may include or interface with one or more Customer database tables containing at least the phone number and/or name of each of a plurality of existing customers of the vendor, existing customers of a third person in business with the vendor, existing prospective customers of the vendor, customers of the vendor within a pre-defined time period, and/or customers of a third person in business with the vendor within a pre-defined time period. In this example, if information associated with an individual is included in the one or more Customer database tables, LRM computing device 105 may determine that the customer status of the individual is at least one of an existing customer of the vendor, an existing customer of a third person in business with the vendor, an existing prospective customer of the vendor, a customer of the vendor within a pre-defined time period, and/or a customer of a third person in business with the vendor within a pre-defined time period; if no information associated with an individual is included in the one or more Customer database tables, LRM computing device 105 may determine that the customer status of the individual is a non-customer.

In the exemplary embodiment, LRM computing device 105 may determine whether there is an existing customer relationship between the lead referral and the vendor by comparing the lead referral information with the information stored on eCRM platform 110 and data sources 125. For example, LRM computing device 105 may compare the name and/or phone number of the lead referral with the name and/or phone number, respectively, of each of the plurality of individuals within eCRM platform 110 and data sources 125. LRM computing device 105 may additionally and/or alternatively compare other information (e.g., home address) associated with the lead referral and each of the plurality of individuals. If the information associated with the lead referral (e.g., name, home address, phone number) matches that of any of the individuals, LRM computing device 105 may determine, based on the customer status of the individual, whether there is an existing customer relationship between the lead referral and the vendor. In one example, LRM computing device 105 determines there is an existing customer relationship if the customer status of the matching individual (e.g., the name of whom matches the name of the lead referral) indicates the individual is an existing customer of the vendor, an existing customer of a third person in business with the vendor, an existing prospective customer of the vendor, a customer of the vendor within a pre-defined time period, and a customer of a third person in business with the vendor within a pre-defined time period. The pre-defined time period may be, for example, measured in a number of days and/or months. In another example, LRM computing device 105 determines there is no existing customer relationship if the customer status of the matching individual indicates the individual is a non-customer or has not been a customer of the vendor within the pre-defined time period.

In the exemplary embodiment, if LRM computing device 105 determines there is an existing customer relationship between the lead referral and the vendor (e.g., LRM computing device 105 determines the lead referral information does not pass 410 the customer check), LRM computing device 105 is configured to display 415 a message to the user indicating that the lead referral information entered by the user matches information associated with an existing customer relationship of the vendor. LRM computing device 105 may display 415 this message on GUI 130 by causing GUI 130 to display the message in the form of a notification, for example, a pop-up window or an overlay notification over a second screen on GUI 130, indicating to the user that a customer relationship exists. In the exemplary embodiment, upon determining that there is an existing customer relationship, LRM computing device 105 may be configured to end 420 the exemplary process 400 for the lead referral. In the exemplary embodiment, LRM computing device 105 may end 420 the exemplary process 400 without creating a lead referral data entry (e.g., blocking the creation of the lead referral data entry) on system 100. In other embodiments, LRM computing device 105 may allow the user to manually create a lead referral data entry on system 100 before ending 420 the exemplary process 400 by causing GUI 130 to display a lead referral input page as an overlay over a second screen displayed within eCRM platform 110, where the overlaid lead referral input page enables the user to input the lead referral information on GUI 130. In other embodiments, LRM computing device 105 may be configured to display on eCRM platform 110 the lead referral input page as a pop-up window within eCRM platform 110, where the pop-up window enables the user to input the lead referral information on GUI 130.

In the exemplary embodiment, if LRM computing device 105 determines that there is no existing customer relationship between the lead referral and the vendor (e.g., LRM computing device 105 determines the lead referral information passes 410 the customer check), LRM computing device 105 may be configured to determine if the lead referral passes 425 a Do-Not-Solicit ("DNS") check. LRM computing device 105 may determine whether the lead referral passes 425 the DNS check before, simultaneous with, or after determining whether the lead referral information passes 410 the customer check. The DNS check may include determining whether the lead referral is on a national DNS registry list. In the exemplary embodiment, LRM computing device 105 is configured to identify a plurality of individuals listed on a national DNS registry list. In one example, eCRM platform 110 and/or data sources 125 may include or interface with one or more DNS database tables containing information (e.g., a name, home address, phone number) associated with a plurality of individuals listed on a national DNS registry. In this example, LRM computing device 105 may identify the plurality of individuals listed on the national DNS registry list using the one or more DNS database tables. LRM computing device 105 may determine whether the lead referral is on a national DNS registry list by comparing the lead referral information (e.g., name, home address, and/or phone number) with the information of the plurality of individuals identified as listed on a national DNS registry list. For example, LRM computing device 105 may compare the information (e.g., name, home address, and/or phone number) of the lead referral with that of each individual included in the one or more DNS database tables. If the information of the lead referral matches that of any of the individuals, LRM computing device 105 may determine that the lead referral is on the national DNS registry list and may cause to display on GUI 130 a pop-up window or an overlay notification over a second screen on GUI 130 indicating to the user that the lead referral may not be contacted via phone call or text message.

Additionally or alternatively, in response to finding the match, LRM computing device 105 is configured to disable displaying, on GUI 130, the phone number associated with the lead referral. Once the DNS check is performed, LRM computing device 105 is configured to create the lead referral data entry on system 100 by transmitting the lead referral information entered by the user to data sources 125. In cases where the lead referral information entered by the user matches the DNS information stored in eCRM platform 110 and/or data sources 125, LRM computing device 105 is configured to include a flag on the lead referral data entry indicating that the lead referral is listed on the DNS registry list and may not be contacted via phone call or text message, thereby protecting the user and the vendor from TCPA violations by confirming that the lead referral is on the national do not call list.

In the exemplary embodiment, if LRM computing device 105 determines the lead referral is not on a national DNS registry list (e.g., LRM computing device 105 determines the lead referral information passes 425 the DNS check), LRM computing device 105 is configured to create 430 a lead referral data entry associated with the lead referral on system 100. LRM computing device 105 may create 430 the lead referral data entry by storing the lead referral information (e.g., name, home address, phone number, relationship between the lead referral and the referrer), for example, on data sources 125, and eCRM platform 110. Additionally or alternatively, LRM computing device 105 may create 430 the lead referral data entry and generate a lead referral account page associated with the lead referral on eCRM platform 110 which displays the lead referral information on the GUI 130. In the exemplary embodiment, the lead referral account page may be selectively accessed by the user on GUI 130.

In the exemplary embodiment, if LRM computing device 105 determines the lead referral is on a national DNS registry list (e.g., LRM computing device 105 determines the lead referral information does not pass 425 the DNS check), LRM computing device 105 is configured to create 435 a lead referral data entry associated with the lead referral. The LRM computing device 105 may create 435 the lead referral data entry in the same manner as it creates 430 the lead referral data entry, detailed above. LRM computing device 105 is further configured, in response to determining the lead referral information does not pass 425 the DNS check, to indicate 440 and/or include a flag on the lead referral data entry that the lead referral is on a national DNS registry list. LRM computing device 105 may indicate 440 that the lead referral is on a national DNS registry list by removing and/or disabling displaying, when, for example, LRM computing device 105 creates 435 the lead referral data entry, any contact information of the lead referral that the national DNS registry list does not permit listing and/or storing. For example, LRM computing device 105 may store all the lead referral information on eCRM platform 110 and data sources 125 except the contact information of the lead referral that the national DNS registry does not permit listing and/or storing. LRM computing device 105 may also create a lead referral account page associated with the lead referral which may display all the lead referral information except the contact information of the lead referral that the national DNS registry list does not permit listing and/or storing. Alternatively or additionally, LRM computing device 105 may display indicia on the lead referral account page denoting that the lead referral is on a national DNS registry list.

Exemplary Process for Real-Time Tracking of Lead Referral Data Entries

Figure 5:
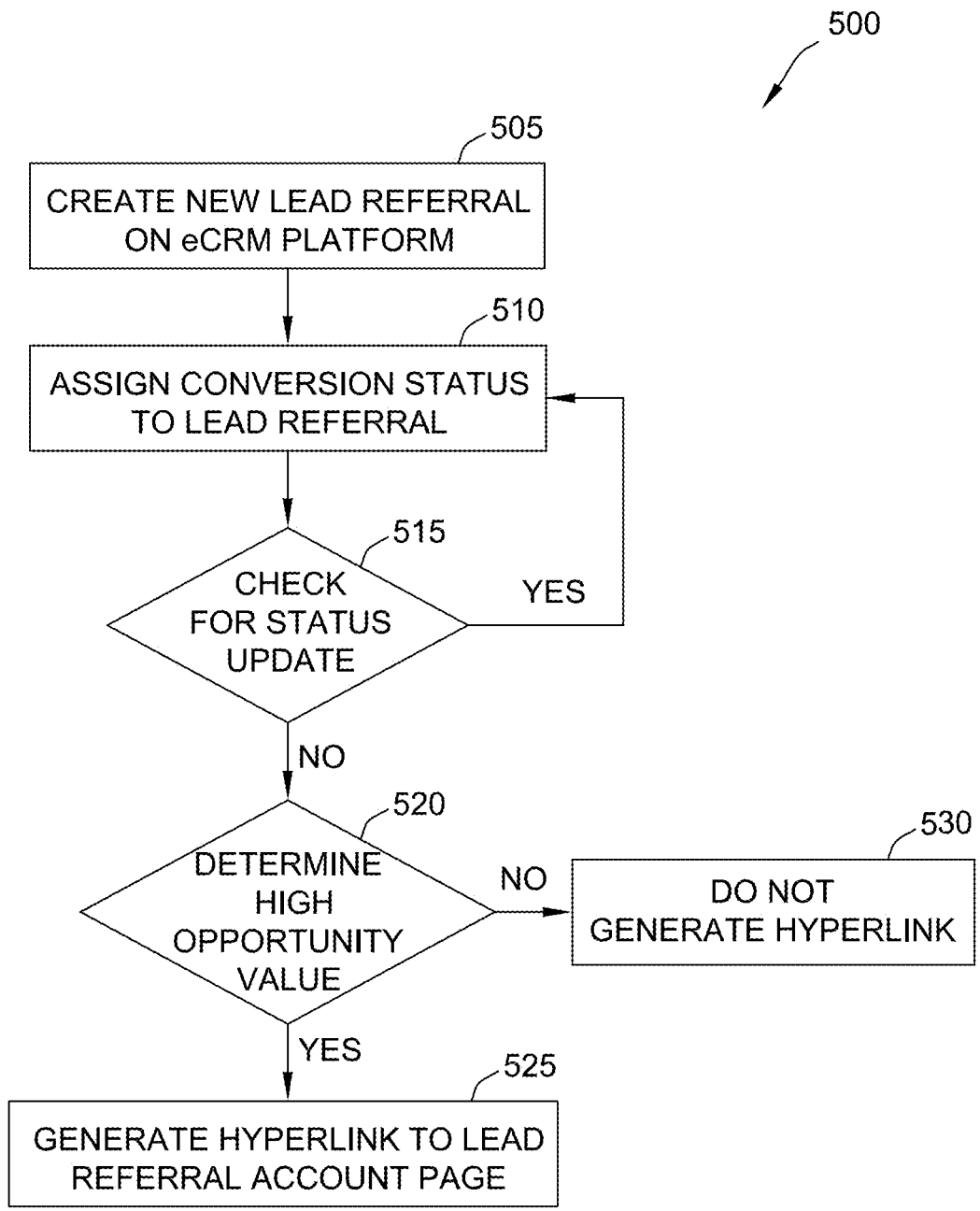
FIG. 5 illustrates a process for real-time tracking of lead referral data entries using the system shown in FIG. 1.
Figure 14B:
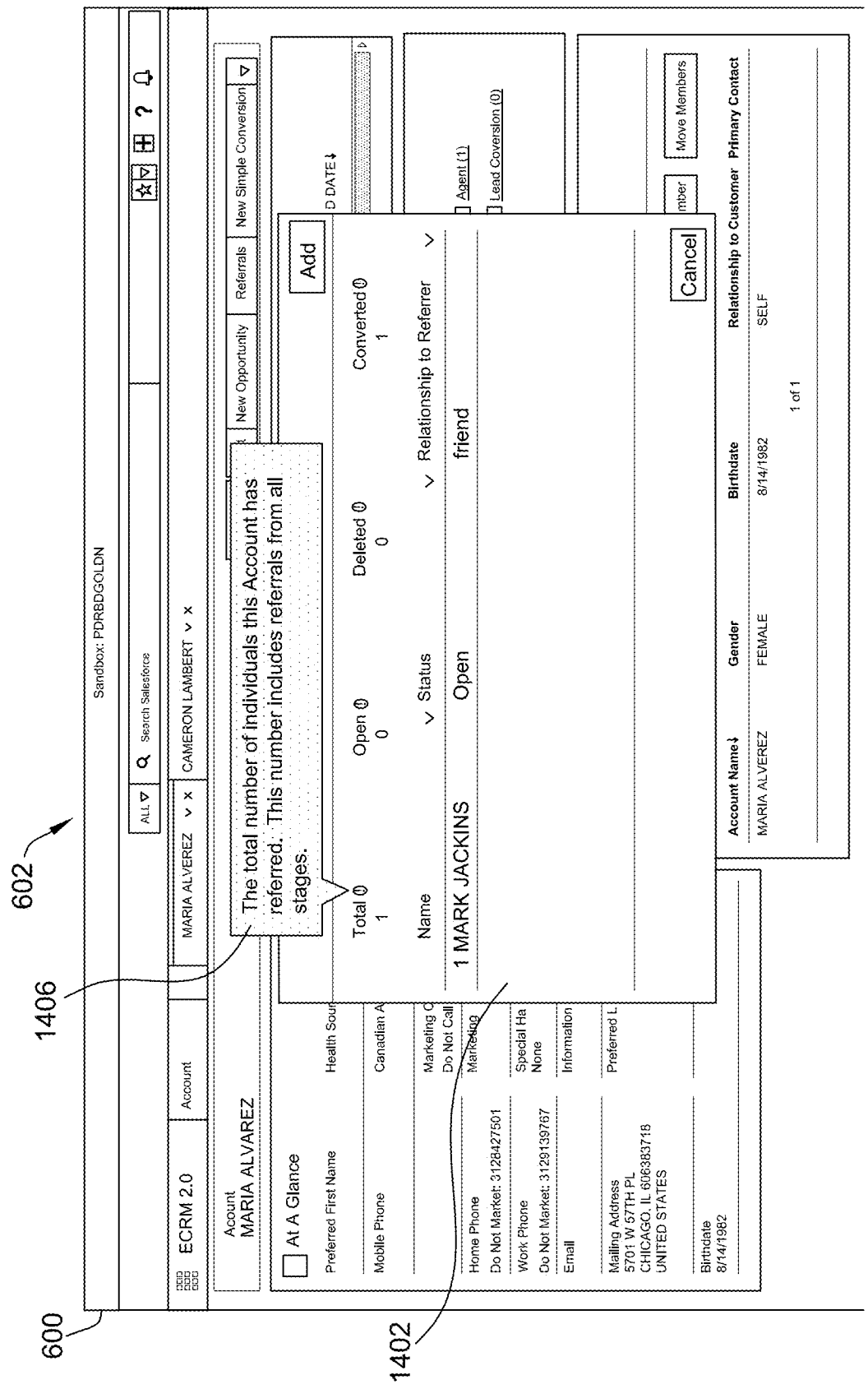
Figure 14E:
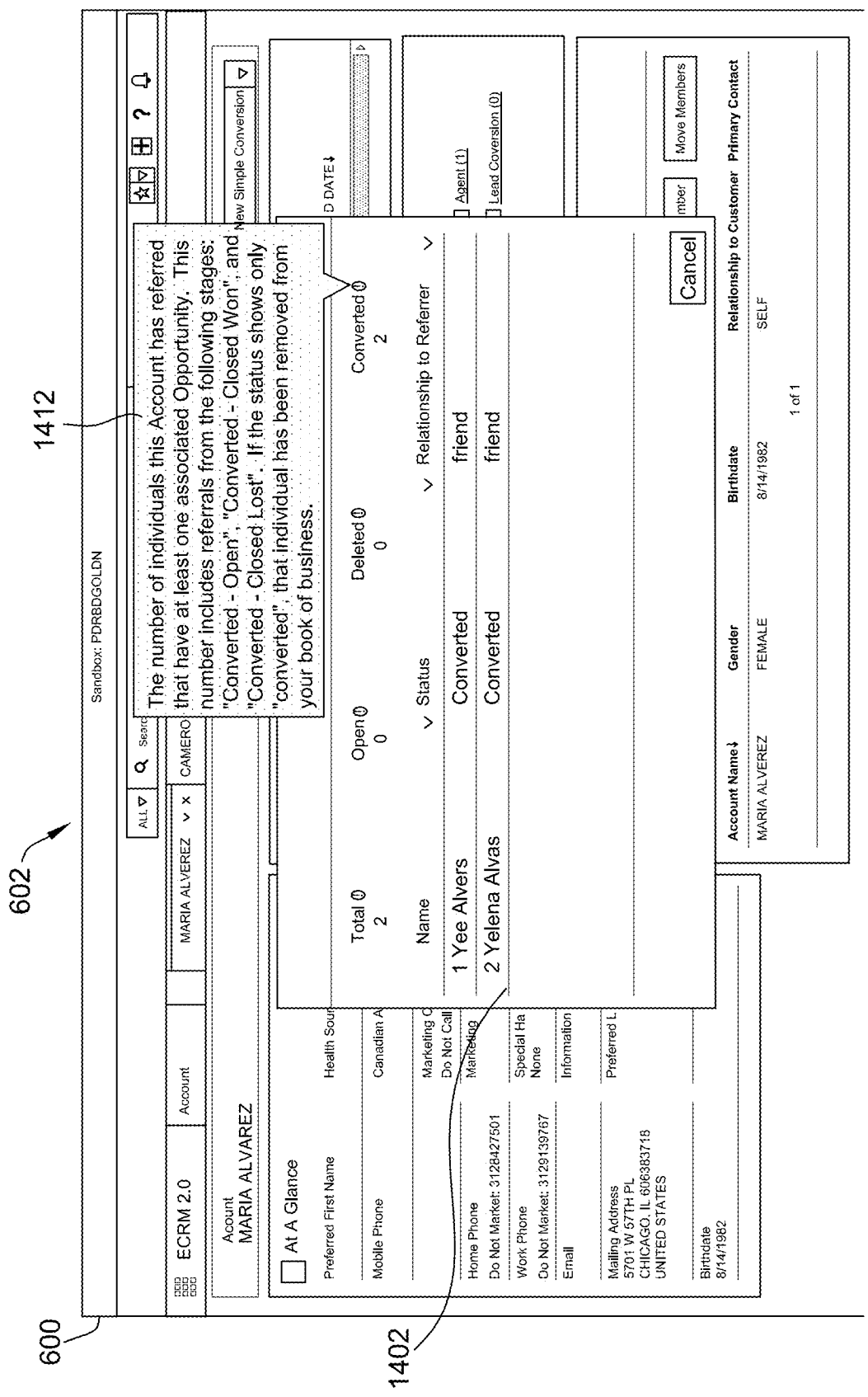

FIG. 5 depicts a flow chart illustrating an exemplary process 500 for real-time tracking of lead referral data entries on an enterprise customer relationship management ("eCRM") platform, such as eCRM platform 110 and one or more data sources, such as one or more data sources 125 (both shown in FIG. 1). In the exemplary embodiment, process 500 may be implemented by a computer system such as system 100, and more specifically, by lead referral management ("LRM") computing device 105 (both shown in FIG. 1).

LRM computing device 105 may create 505 a new lead referral data entry on system 100, and more specifically, on eCRM platform 110 and data sources 125. LRM computing device 105 may create 505 the lead referral data entry using, for example, process 400 (shown in FIG. 4). In the exemplary embodiment, once the lead referral data entry is created on system 100, LRM computing device 105 may display lead referral information associated with the lead referral on a lead referral summary window of eCRM platform 110 via a user interface of a user computing device, such as GUI 130 on user computing device 115. LRM computing device 105 may also display the lead referral information on a lead referral account page on GUI 130.

Once LRM computing device creates 505 the new lead referral data entry on system 100, the lead referral may immediately be accessed by a plurality of users on a plurality of user computing devices 115. For example, each of the plurality of users may access eCRM platform 110 on user computing device 115 associated with each user. In the exemplary embodiment, the lead referral information is accessed via GUI 130 using a lead referral summary window or a lead referral account page associated with the lead referral data entry.

LRM computing device 105 may also assign 510 a conversion status to the lead referral data entry. In one example, conversion statuses that may be assigned to a lead referral data entry may include: an Open status representing a new lead referral; a Converted Open status representing a lead referral converted to a prospective customer; a Converted Closed-Won status representing a lead referral converted to a prospective customer, and where at least one opportunity associated with the lead referral is successfully converted; a Converted Closed-Lost status representing a lead referral converted to a prospective customer and all of the opportunities associated with the lead referral are unsuccessful; a Converted status representing a lead referral converted to a prospective customer and subsequently deleted as lead referral; and/or a Deleted status representing a lead referral that was deleted by a user of LRM computing device 105 or by an automatic purge (e.g., purging old referrals from system 100 the based upon a predetermined period of time) by LRM computing device 105. In another example, conversion statuses that may be assigned to a lead referral may include: a New status representing a new lead referral; a Contact Established status representing a lead referral who has been contacted by an agent or team member; a Quote in Progress status representing a lead referral for whom a quote is being prepared; a Quote Provided status representing a lead referral to whom a quote has been sent; an Application Pending status representing a lead referral for whom an application is pending; an Application Submitted status representing a lead referral for whom an application has been submitted; and/or a Closed status representing a lead referral that has been closed and all opportunity to convert the lead referral has been lost.

The conversion status may represent an opportunity value associated with the lead referral. The opportunity value may be defined as the potential opportunity of the user to convert the lead referral to a customer of the vendor. In the exemplary embodiment, LRM computing device 105 may assign 510 the lead referral a pre-defined conversion status or a user-defined conversion status. The pre-defined conversion status may be a conversion status that is automatically assigned to a lead referral once LRM computing device 105 creates 505 the lead referral data entry on system 100. In one example, the pre-defined conversion status may be a conversion status that represents a high opportunity value such as, for example, an Open conversion status. The user-defined conversion status may be a conversion status input by the user on user computing device 115. The user-defined conversion status may be a conversion status that represents a different opportunity value than the pre-defined conversion status. For example, the user-defined conversion status may represent a low opportunity value. In another example, the user-defined conversion status may be a different conversion status from the pre-defined conversion status but also represent a high opportunity value. In the exemplary embodiment, LRM computing device 105 is configured to receive the user-defined conversion status input by the user on GUI 130. LRM computing device 105 may assign 510 the user-defined conversion status to the lead referral data entry after LRM computing device 105 has assigned 510 the pre-defined conversion status, in which case the user-defined conversion status replaces the pre-defined conversion status assigned to the lead referral data entry.

Once LRM computing device 105 assigns 510 the conversion status to the lead referral, LRM computing device 105 may display the conversion status on eCRM platform 110. In the exemplary embodiment, LRM computing device 105 displays the conversion status in the lead referral summary window. Each user of eCRM platform 110 is then able to view the conversion status of the lead referral by, for example, accessing the lead referral summary window.

LRM computing device 105 may also continuously check 515 for status updates associated with the conversion status of each lead referral on system 100. The status updates may indicate that a change in the conversion status of a lead referral has occurred. If LRM computing device 105 determines a change to the conversion status of the lead referral has occurred, LRM computing device 105 may assign 510 an updated conversion status to the lead referral. In one example, LRM computing device checks 515 for a status update if the lead referral information associated with a lead referral is changed by a user. The user may be different from the original user who input the lead referral information. The user may be able to edit lead referral information associated with a lead referral data entry previously created 505 by LRM computing device 105 on system 100. When the lead referral information is edited and the changes are saved by the user, LRM computing device 105 may check 515 for a user-defined conversion status input by the user. If LRM computing device 105 determines that the user has input a user-defined conversion status, LRM computing device 105 may assign 510 the user-defined conversion status to the lead referral, replacing the previously assigned conversion status. In another example, LRM computing device checks 515 for a status update by retrieving information from eCRM platform 110 and/or data sources 125. Data sources 125 and eCRM platform 110 may contain conversion status information of lead referral data entries created on system 100. For example, eCRM platform 110 and/or data sources 125 may include or interface with an Opportunity database table or Opportunity object, which includes up-to-date conversion status information for each lead referral. LRM computing device 105 may continuously check 515 eCRM platform 110 and data sources 125 for a status update associated with the conversion status of each lead referral data entry created on system 100. For example, LRM computing device 105 may continuously check the Opportunity object and thereby track in real-time the conversion status of each lead referral. LRM computing device 105 may also determine when the conversion status information stored on eCRM platform 110 and data sources 125 indicates an updated conversion status of a lead referral. For example, LRM computing device 105 may determine that the Opportunity object indicates that a conversion status of a lead referral has changed. LRM computing device 105 may then assign 510 the updated conversion status to the lead referral.

LRM computing device 105 may also determine 520 whether the conversion status assigned to the lead referral represents a high opportunity value. In the exemplary embodiment, the conversion status assigned to the lead referral represents an opportunity value. The opportunity value may be defined as the as the potential opportunity of the user to convert the lead referral to a customer of the user. In the exemplary embodiment, the opportunity value may be one of a high opportunity value and a low opportunity value. The high opportunity value may reflect an open potential for the user to convert the lead referral to a customer. In one example, conversion statuses that represent a high opportunity value may include: an Open status; a Converted Open status; and/or a Converted Closed-Won status. In another example, conversion statuses that represent a high opportunity value may include: a New status; a Contact Established status; a Quote in Progress status; a Quote Provided status; an Application Pending status; and/or an Application Submitted status. The low opportunity value may reflect a closed potential for the user to convert the lead referral to a customer. In one example, conversion statuses that represent a low opportunity value may include: a Converted Closed-Lost status; a Converted status; and/or a Deleted status. In another example, conversion statuses that represent a low opportunity value may include a Closed status.

In the exemplary embodiment, LRM computing device 105 may determine 520 that more than one conversion status represents a high opportunity value. In one example, LRM computing device 105 may automatically assign 510, to each new lead referral data entry created on system 100, a conversion status that LRM computing device 105 determines 520 represents a high opportunity value. This may reflect that there is open potential for the user to follow up with a new lead referral to potentially convert them to a new customer. In another example, LRM computing device 105 may determine 520 a conversion status of a lead referral converted to a prospective customer represents a high opportunity value. This may reflect an open potential for the user to convert a prospective customer to a customer. In a further example, LRM computing device 105 may determine 520 a conversion status of a lead referral converted to a prospective customer and which has at least one opportunity associated with the lead referral which was successfully converted represents a high opportunity value. This may reflect an open potential for the user to successfully convert other opportunities associated with the lead referral.

In the exemplary embodiment, LRM computing device 105 may determine 520 that more than one conversion status represents a low opportunity value, that is, does not represent a high opportunity value. In one example, LRM computing device 105 may determine 520 a conversion status of a lead referral converted to a prospective customer and all of the opportunities associated with the lead referral are unsuccessful does not represent a high opportunity value. This may reflect a closed potential for the user to successfully convert the prospective customer to a customer because there are no open opportunities associated with the prospective customer remaining. In another example, LRM computing device 105 may determine 520 a conversion status of a lead referral deleted from eCRM platform 110 and/or data sources 125 represents a low opportunity value. This may reflect that the deleted lead referral is no longer considered an open opportunity for the user.

LRM computing device 105 may also generate 525 a hyperlink to the lead referral account page associated with the lead referral data entry. In the exemplary embodiment, LRM computing device 105 may generate the hyperlink in response to determining 520 the conversion status of the lead referral represents a high opportunity value. Accordingly, LRM computing device 105 does not generate 530 a hyperlink for the lead referral if it determined 520 that the conversion status of the lead referral does not represent a high opportunity value, that is, represents a low opportunity value. The hyperlink may be displayed on GUI 130 and may allow the user to access the lead referral account page associated with the lead referral data entry when the user selects the hyperlink. In one example, the hyperlink may be displayed on the lead referral summary window on GUI 130.

In some embodiments, LRM computing device 105 may further remove the hyperlink from GUI 130. For example, LRM computing device 105 may determine 520 a conversion status of a lead referral represents a high opportunity value and generate 525 a hyperlink to the lead referral account page associated with the lead referral. LRM computing device 105 may then check 515 for an update to the conversion status of the lead referral and may assign 510 an updated conversion status to the lead referral. LRM computing device 105 may then determine 520 that the updated conversion status of the lead referral does not represent a high opportunity value. LRM computing device 105 may then remove the hyperlink from GUI 130 in addition to not generating 530 a hyperlink.

Exemplary Graphical User Interface

Figure 6:
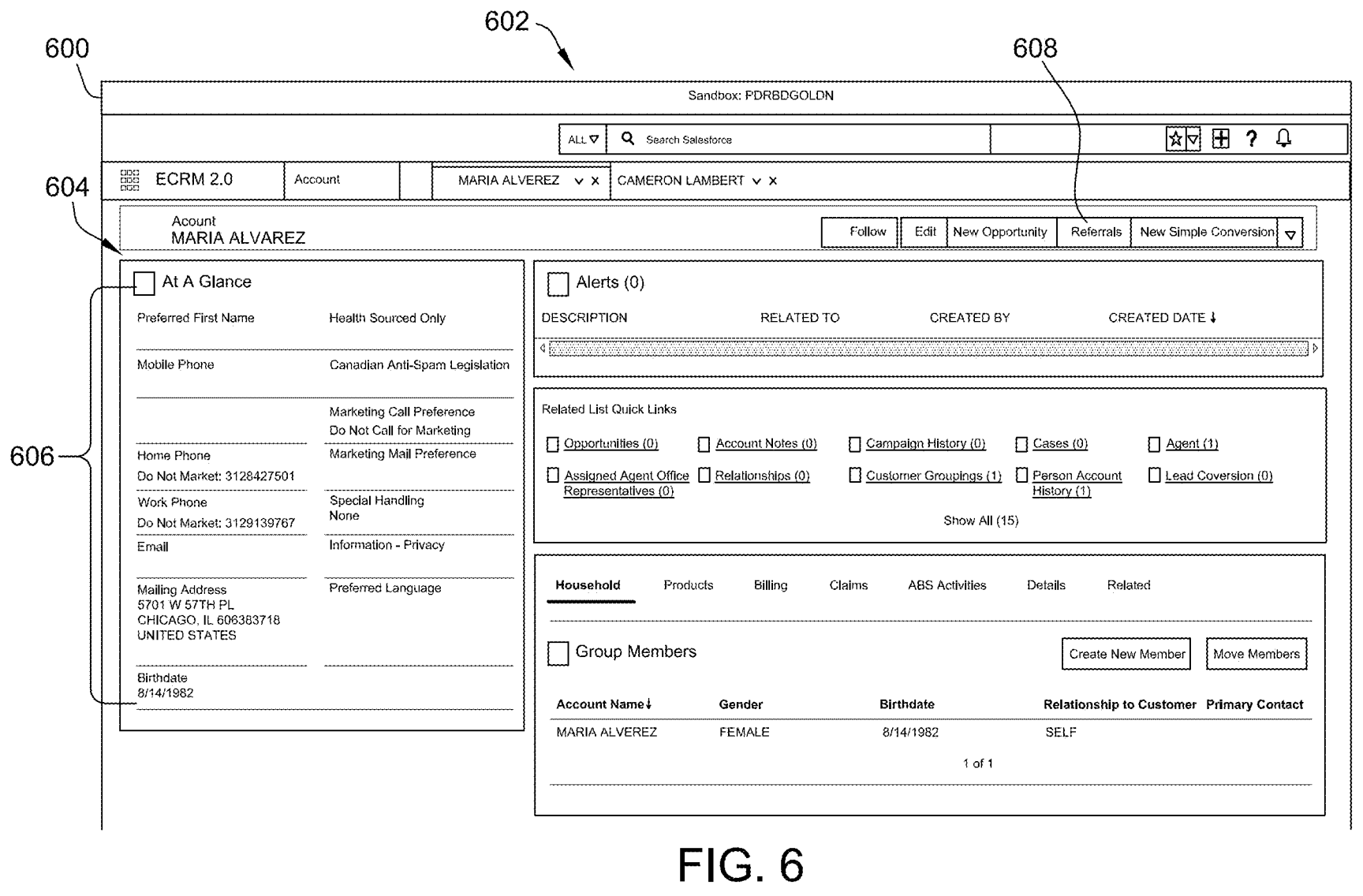

FIG. 6 illustrates a first view of graphical user interface ("GUI") 602 presented on user computing device 600, similar to user computing device 115 (shown in FIG. 1). GUI 602 may be generated and transmitted by LRM computing device 105 (shown in FIG. 1) and may provide means for a user to input customer data, view customer account pages, and/or initiate creation of a new lead referral data entry. In some embodiments, the GUI 602 may be integrated in an enterprise customer relationship management ("eCRM") platform, such as enterprise customer relationship management ("eCRM") platform 110 (shown in FIG. 1), and the GUI 602 may display customer information stored on a database in communication with LRM computing device 105, such as eCRM platform 110 and/or data sources 125 (shown in FIG. 1).

GUI 602 is configured to display a customer account page associated with a customer account on eCRM platform 110, such as customer account page 604. In the exemplary embodiment, customer account page 604 allows a user to access data associated with a customer. In some embodiments, the customer may be a customer of a user, such as user 210 (shown in FIG. 2). In other embodiments, the customer may be a customer of a person in a business relationship with the user. For example, the user may be an agent for a vendor (e.g., a service and/or goods provider, such as an insurance provider) and the customer may be a customer of another agent of the same vendor. In the exemplary embodiment, there is a customer account page for every customer account that may be displayed on eCRM platform 110.

Customer account page 604 includes customer summary 606 which displays customer information associated with the customer. For example, customer summary 606 may display the name of the customer, contact information including the home address and phone number of the customer, and other personal customer information. Customer summary 606 may also display indicia that the customer is on a national Do-Not-Solicit (DNS) registry list. For example, as shown in FIG. 6, customer summary 606 may include Marketing Call Preference information, such as, as shown in this embodiment, "Do Not Call for Marketing" and may further include "Do Not Market" adjacent to the phone number of the customer.

In the exemplary embodiment, customer account page 604 also includes referrals button 608 which enables the user to view lead referral data entries created on system 100. The user may select referrals button 608 which causes GUI 602 to display referral summary window 702 (shown in FIG. 7). GUI 602 may allow a user to enter a new lead referral from referral summary window 702, in accordance with the present disclosure.

Figure 7:
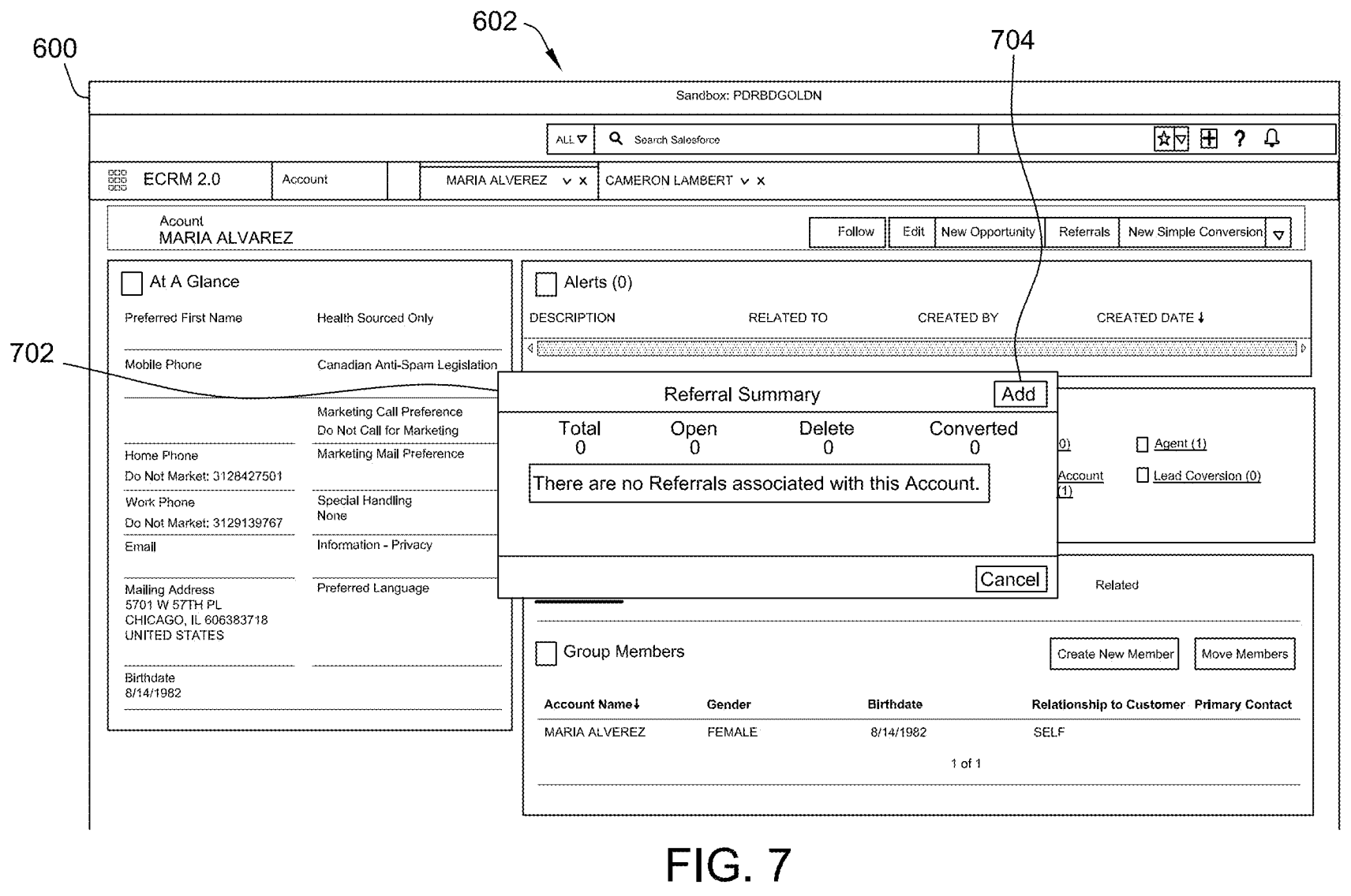

FIG. 7 illustrates a second view of GUI 602 presented on user computing device 600. GUI 602 is configured to display referral summary window 702 in response to the user selecting referrals button 608 (shown in FIG. 6). Referral summary window 702 may include add referral button 704 which allows the user to enter a new lead referral using referral input window 802 (shown in FIG. 8).

Figure 8:
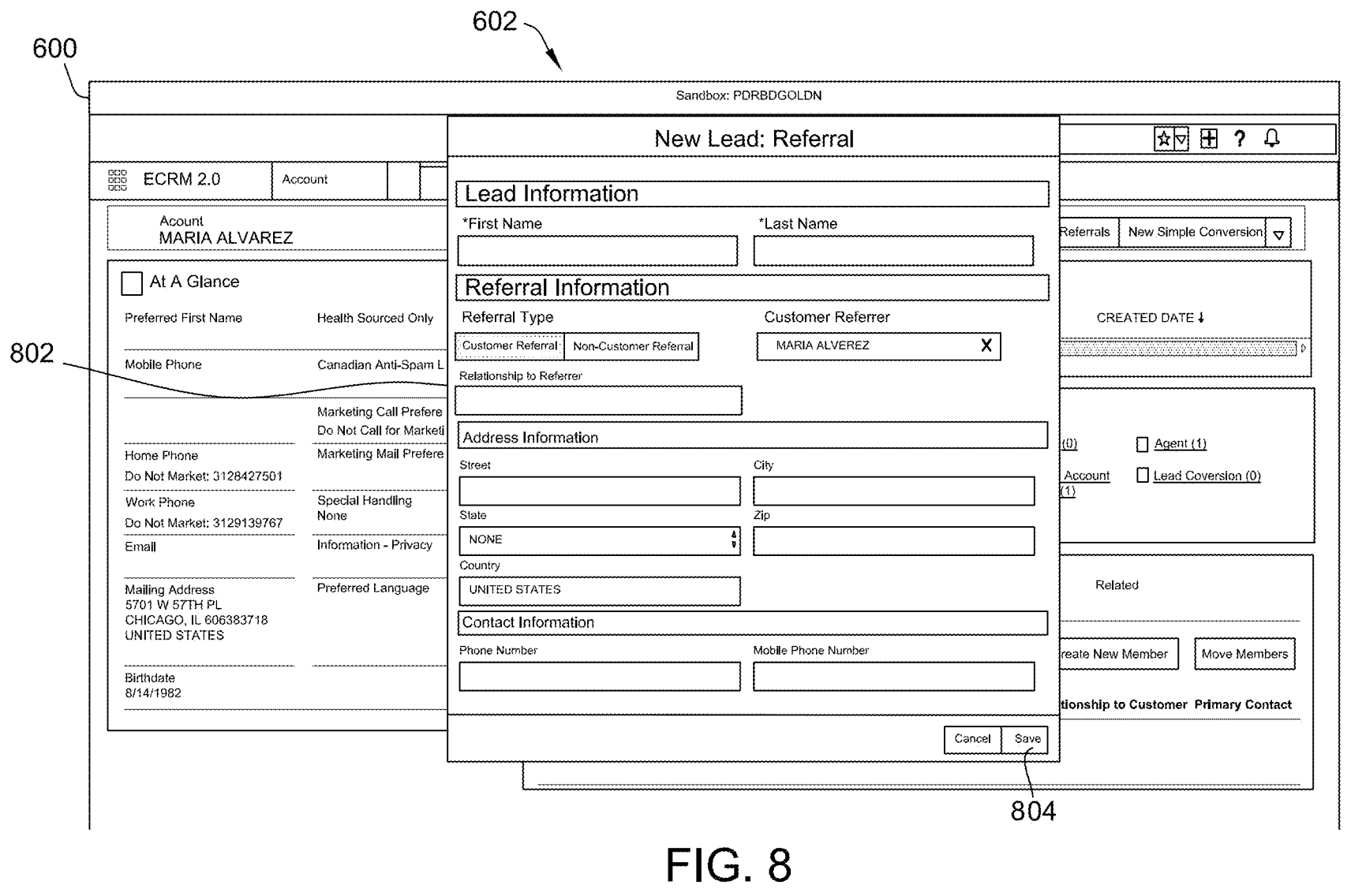

FIG. 8 illustrates a third view of GUI 602 presented on user computing device 600. GUI 602 is configured to display referral input window 802 in response to the user selecting add referral button 704 on referral summary window 702 (shown in FIG. 7). Referral input window 802 allows the user to enter lead referral information associated with a new lead referral. For example, as shown in FIG. 8, the user can enter the name of the lead referral and contact information of the lead referral such as home address and phone number. The user can also enter in the information of the person who provided the lead referral, e.g. the referrer. The user may also indicate whether the referrer is a customer associated with the user, and may further indicate the relationship between the lead referral and the referrer. After the user enters the lead referral information, the user may create the lead referral data entry by clicking the save button 804 on referral input window 802. In the exemplary embodiment, in accordance with the present disclosure, this may cause a lead referral management computing device, such as LRM computing device 105 (shown in FIG. 1) to check whether the lead referral is an existing customer associated with the vendor, and/or whether the lead referral is listed on a national Do-Not-Solicit registry list. LRM computing device 105 may also create the lead referral data entry on an eCRM platform, such as eCRM platform 110 (shown in FIG. 1), and one or more data sources, such as data sources 125 (shown in FIG. 1), in response to the user entering the lead referral information on referral input window 802 and clicking save button 804.

Figure 9:
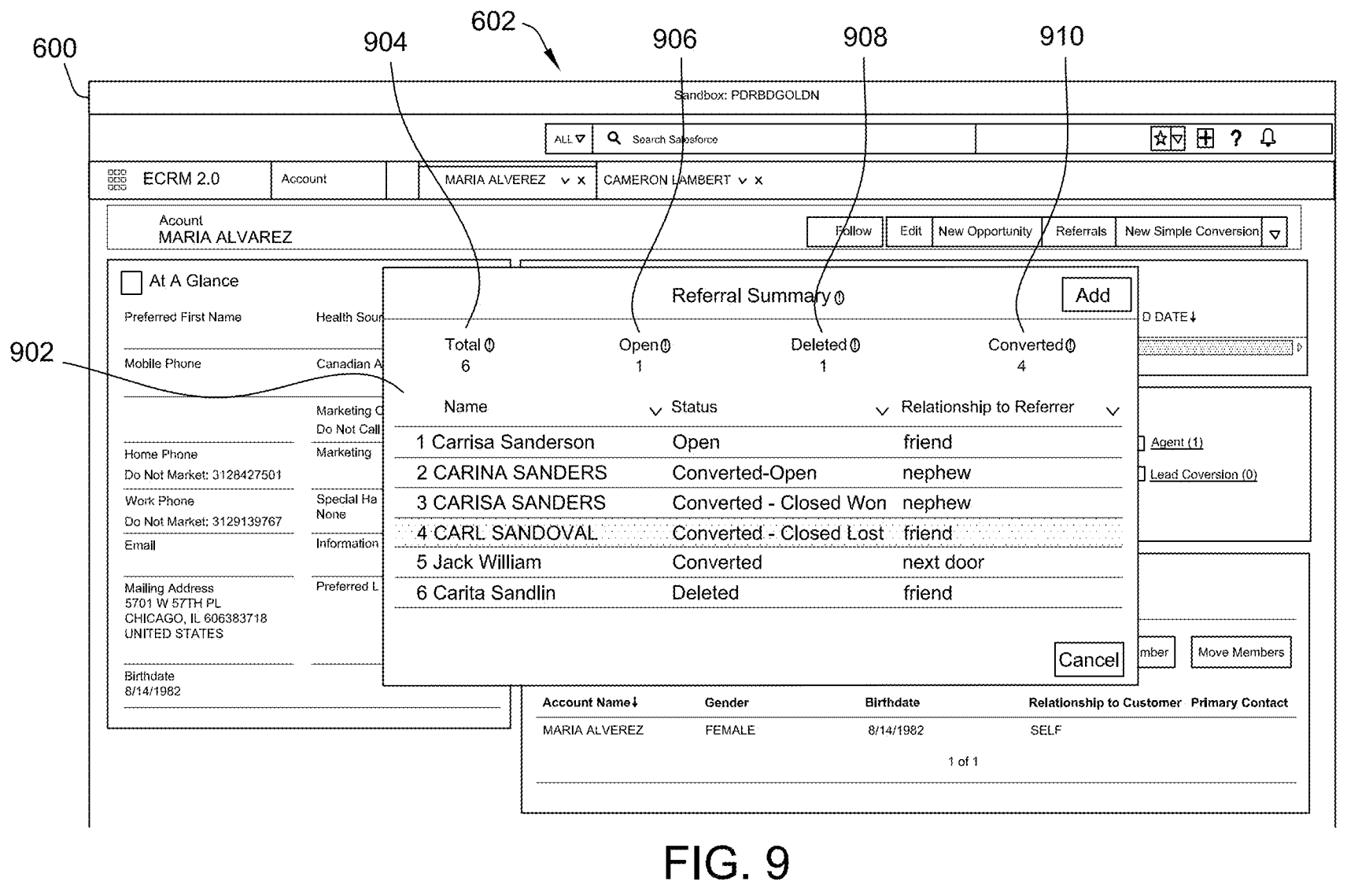

FIG. 9 illustrates a fourth view of GUI 602 presented on user computing device 600. GUI 602 is configured to display referral summary window 902 which includes lead referral data entries created on an eCRM platform, such as eCRM platform 110, and one or more data sources, such as data sources 125 (both shown in FIG. 1). In the exemplary embodiment, referral summary window 902 is associated with an individual referrer such that the lead referrals displayed on referral summary window 902 were obtained from the same referrer. For example, referral summary window 902 may display each lead referral created by the user on referral input window 802 in which the user identified the same referrer. In another example, the referrer of the lead referrals displayed on referral summary window 902 may be a customer of the user. In this example, referral summary window 902 is displayed when the user selects a referrals button on the customer account page associated with the customer, such as referrals button 608 on customer account page 604 (shown in FIG. 6). As a further example, referral summary window 702 (shown in FIG. 7) may be displayed when the user selects a referrals button on a customer account page associated with a customer who has not provided any lead referrals. There may thus be a separate referral summary window associated with each customer and accessible from each respective customer account page.

In the exemplary embodiment, each lead referral displayed on referral summary window 902 includes the name of the lead referral as well as a conversion status of the lead referral data entry and the relationship between the lead referral and the vendor. The conversion status may be assigned to each lead referral data entry by a lead referral management computing device, such as LRM computing device 105 (shown in FIG. 1), in accordance with the present disclosure. Referral summary window 902 may also include an overview of the total count 904 of the lead referrals displayed on referral summary window 902, as well as a count of the lead referrals displayed on referral summary window 902 which are assigned a certain conversion status. For example, referral summary window 902 includes an Open count 906 of lead referrals assigned an Open conversion status, a Converted count 910 of lead referrals assigned a Converted conversion status, and a Deleted count 908 of lead referrals that have been deleted by a user.

Figure 10:
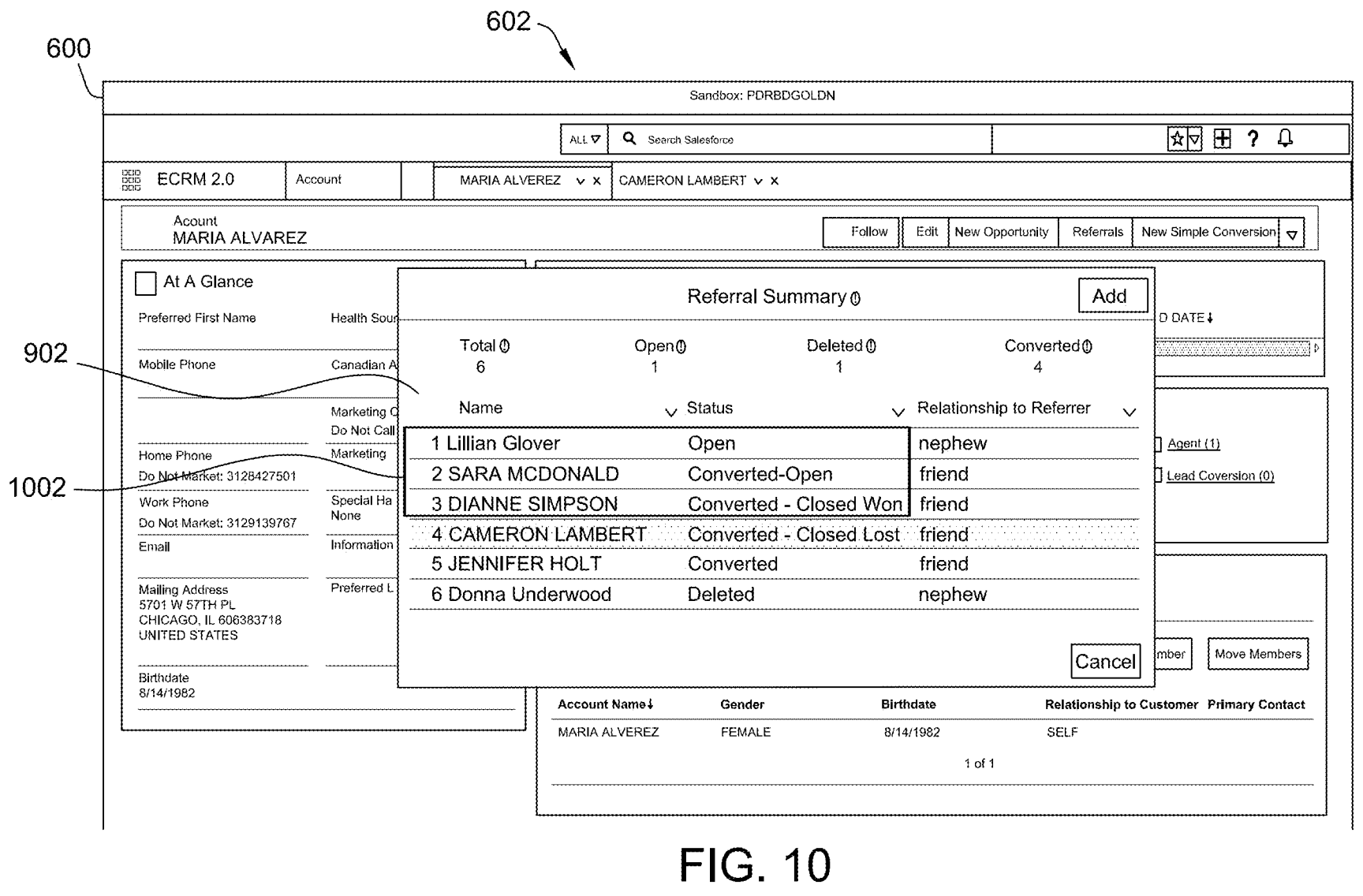
Figure 11:
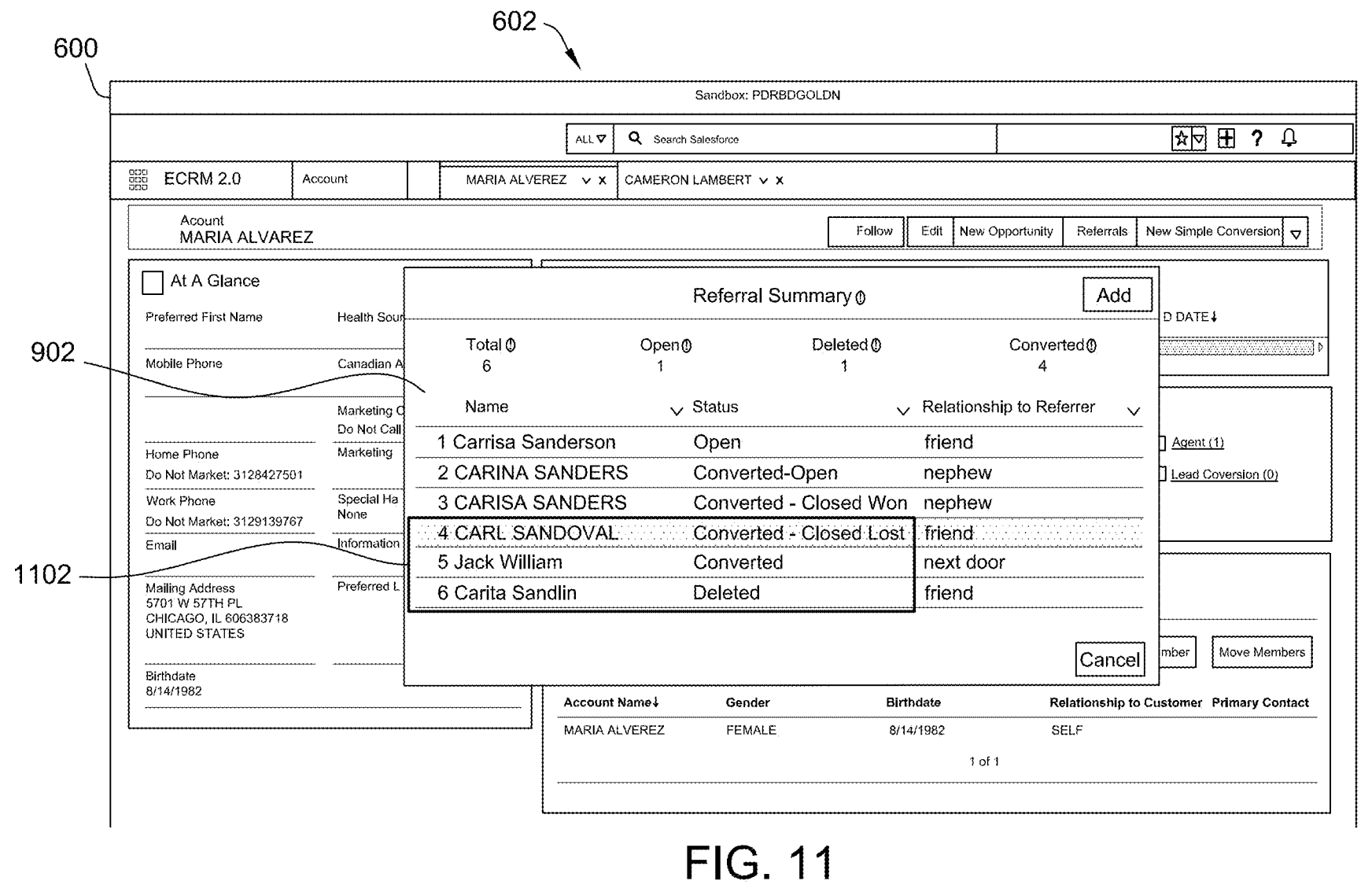

As shown in FIGS. 10 and 11, referral summary window 902 may further include a hyperlink for lead referrals generated by LRM computing device 105 (shown in FIG. 1). In the exemplary embodiment, hyperlinks are only generated for lead referrals assigned a conversion status that represents a high opportunity value for the lead referral, and not for lead referrals assigned a conversion status that represents a low opportunity value. For example, as shown in lead referral group 1002 in FIG. 10, hyperlinks may be generated for lead referrals assigned one of: an Open conversion status, a Converted Open conversion status, and a Converted Closed-Won conversion status. In the exemplary embodiment, the hyperlink is displayed on referral summary window 902 as the name of the lead referral. As a further example, as shown in lead referral group 1102 in FIG. 11, hyperlinks may not be generated for lead referrals assigned one of: a Converted Closed-Lost conversion status and a Deleted conversion status.

Figure 12:
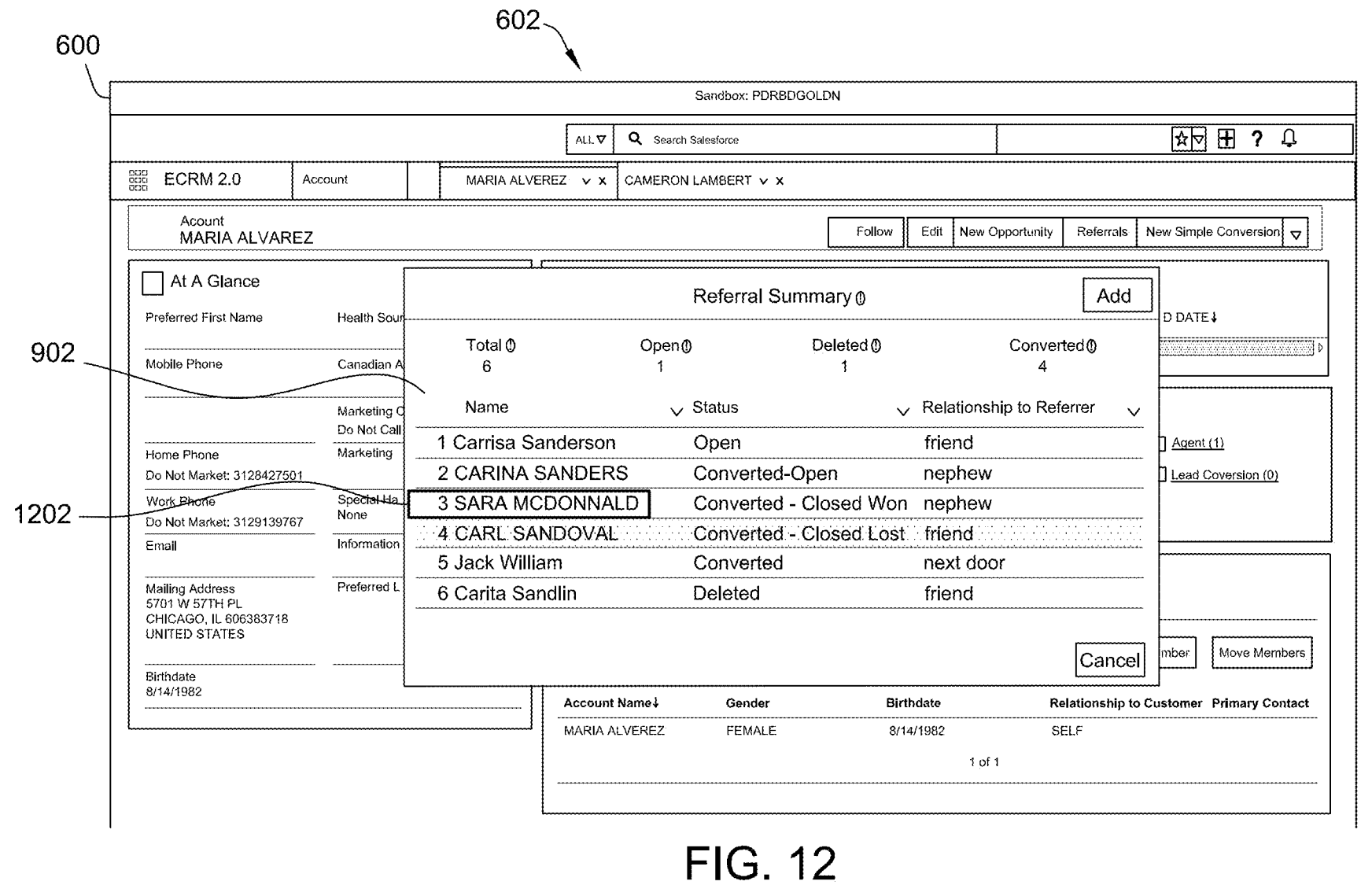

As shown in FIG. 12, the user can select hyperlink 1202 displayed on referral summary window 902. The hyperlink allows the user to access a lead referral account page 1302 (shown in FIG. 13) associated with the lead referral.

Figure 13:
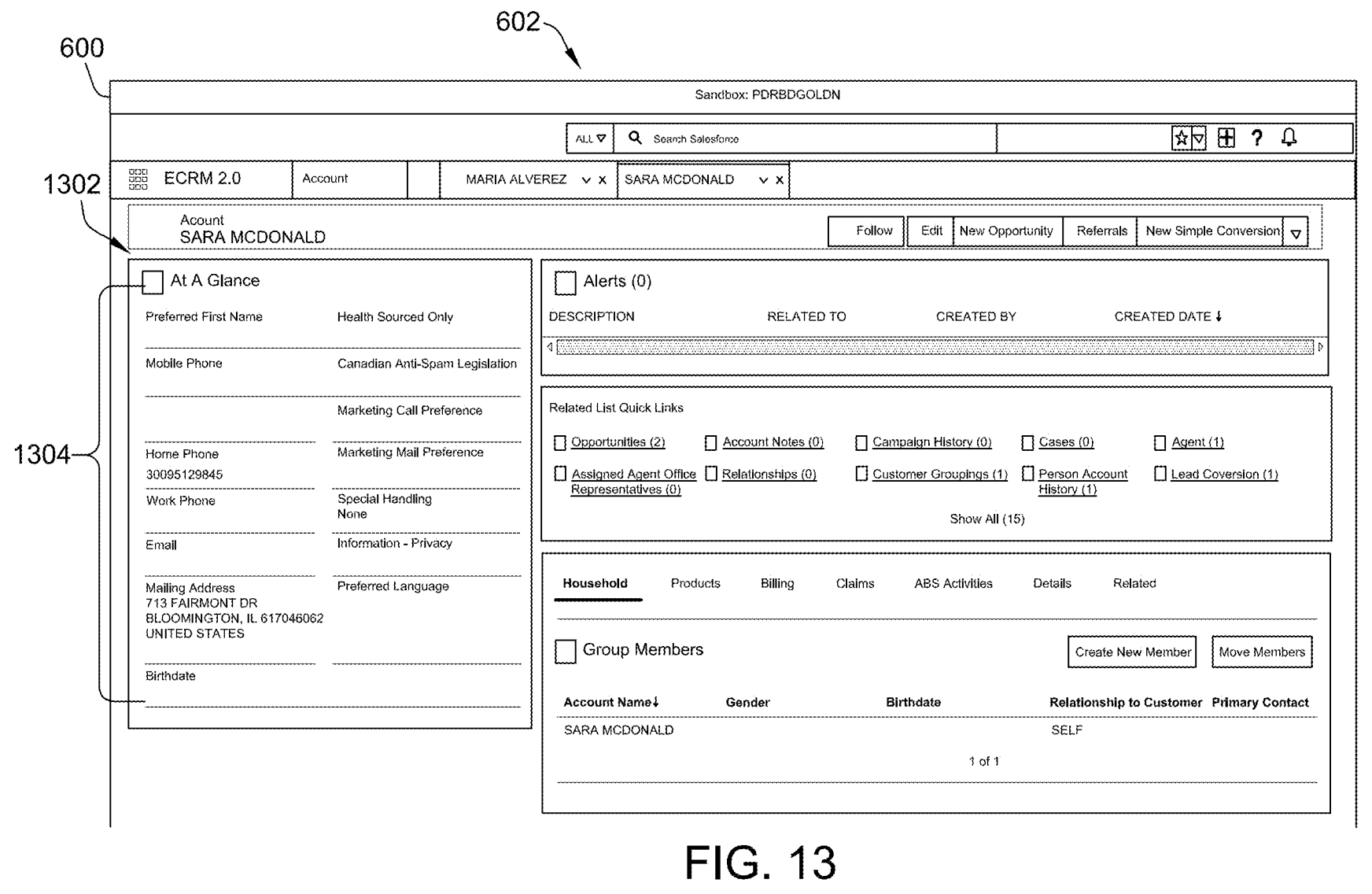

FIG. 13 illustrates a fifth view of GUI 602 presented on user computing device 600. GUI 602 is configured to display lead referral account page 1302 associated with the lead referral in response to the user selecting hyperlink 1202 on referral summary window 902. In the exemplary embodiment, lead referral account page 1302 is created on eCRM platform 110 (shown in FIG. 1) when the lead referral data entry is created on system 100 (shown in FIG. 1). Lead referral account page 1302 may be similar to a customer account page, such as customer account page 604 (shown in FIG. 6), and may allow a user to access data associated with a lead referral.

Lead referral account page 1302 includes lead referral summary 1304 which displays lead referral information associated with the lead referral. The lead referral information may mirror the lead referral information input by the user when creating the lead referral data entry on system 100. For example, lead referral summary 1304 may display the lead referral information entered into referral input window 802 (shown in FIG. 8) by the user, including the name and contact information of the lead referral. Lead referral summary 1304 may also display indicia that the lead referral is on a national Do-Not-Solicit ("DNS") registry list. For example, lead referral summary 1304 may include Marketing Call Preference information, such as, as shown in this embodiment, "Do Not Call for Marketing" and may further include "Do Not Market" adjacent to the phone number of the customer, such as is shown in customer summary 606 in FIG. 6. LRM computing device 105 may automatically add such indicia to lead referral summary 1304 upon determining the lead referral is on a national DNS registry list.

Figure 14A:
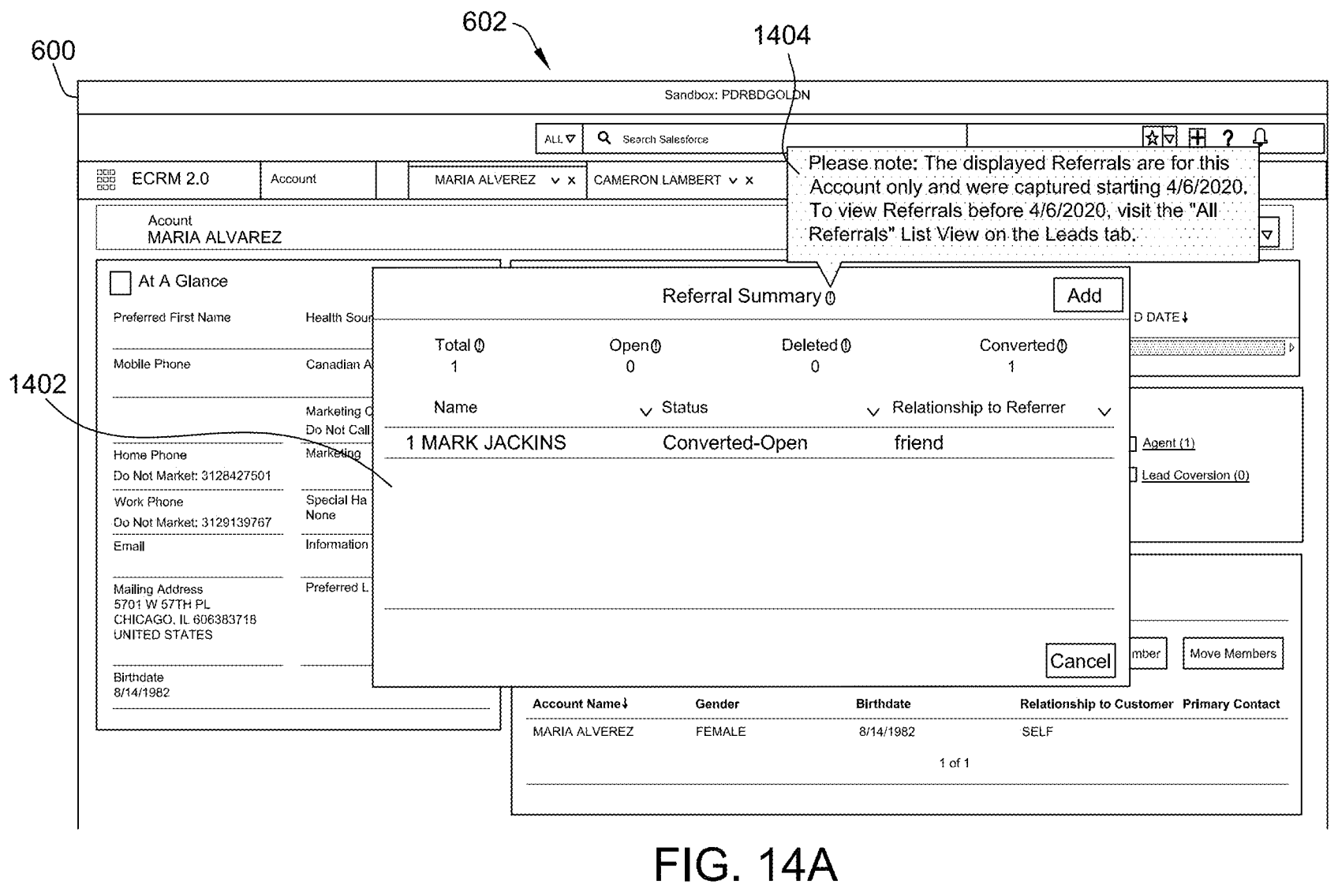
Figure 14C:
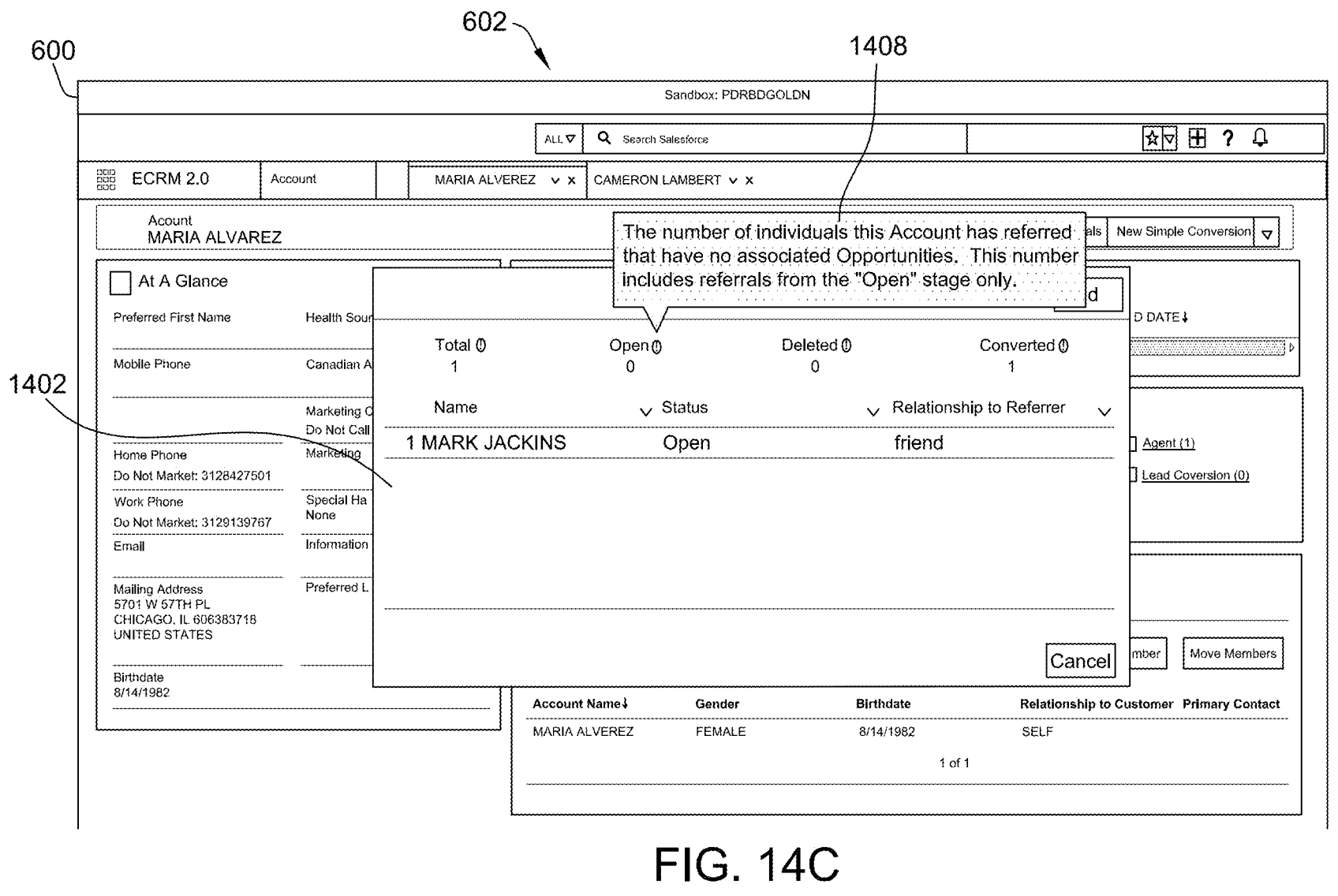
Figure 14D:
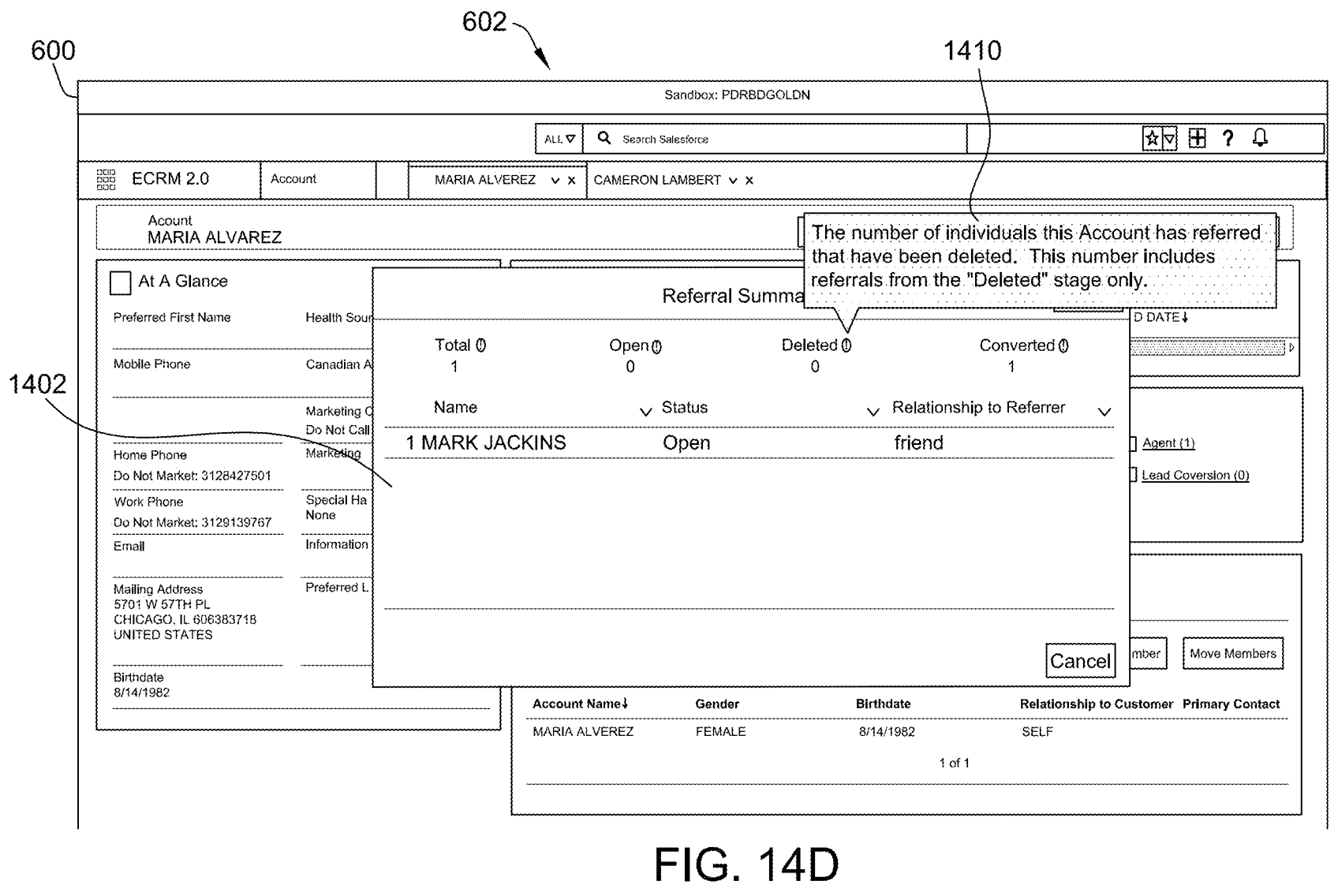

FIGS. 14A-14E illustrates a plurality of alternative views of a sixth view of GUI 602 presented on user computing device 600. GUI 602 is configured to display messages on a referral summary window, such as referral summary window 1402, in response to the user scrolling over portions of the referral summary window. In the exemplary embodiment, messages may be displayed to provide the user an explanation of the information displayed on the referral summary window. In a first example shown in FIG. 14A, referral summary message 1404 is provided to the user which gives general information related to referral summary window 1402. In a second example shown in FIG. 14B, total count message 1406 is provided to the user which explains the total count number displayed on referral summary window 1402. In a third example shown in FIG. 14C, open referral count message 1408 is provided to the user which explains the open lead referral data entry count number displayed on referral summary window 1402. In a fourth example shown in FIG. 14D, deleted referral count message 1410 is provided to the user which explains the deleted lead referral data entry count number displayed on referral summary window 1402. In a fifth example shown in FIG. 14E, deleted referral count message 1412 is provided to the user which explains the converted lead referral data entry count number displayed on referral summary window 1402.

Figure 15:
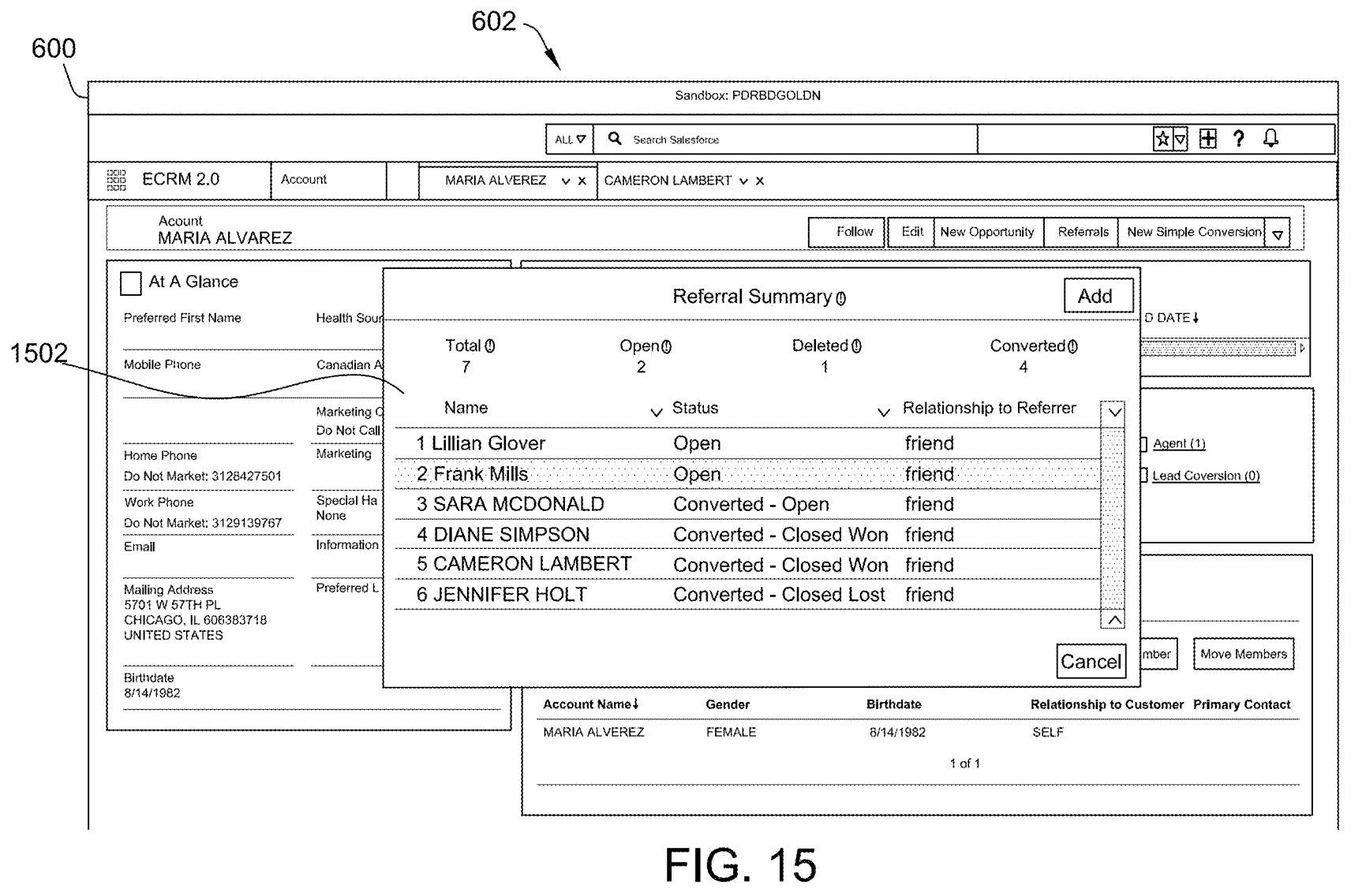
Figure 16:
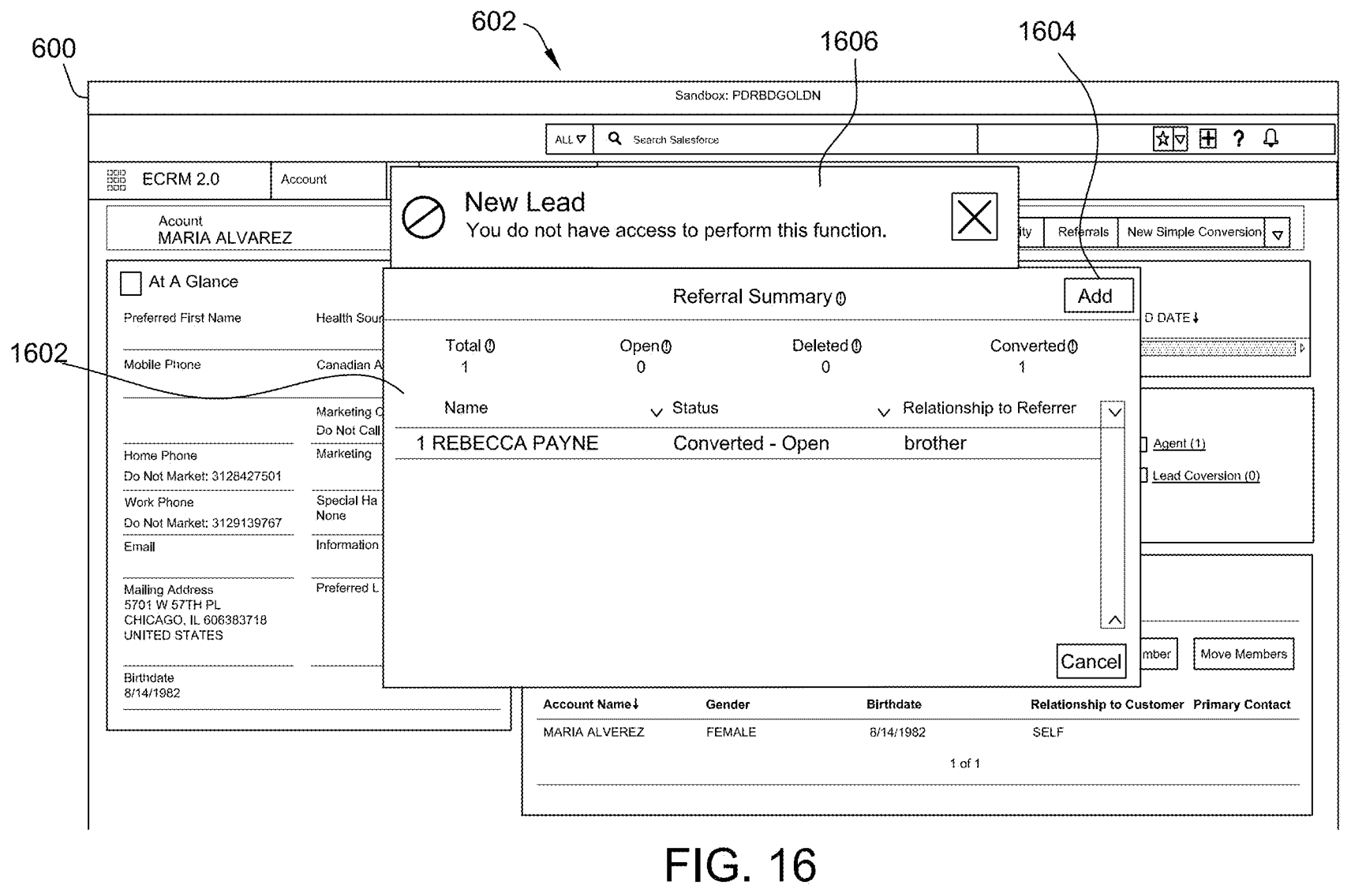

In some embodiments, some users may have access to view, but not create (e.g., initiate creation), lead referral data entries. For example, some users may be sales agents and agent team members who speak directly with lead referrals and may create lead referral data entries in accordance with the present disclosure, and other users such as sales leaders and/or business support personnel may have access to view, but not create, these lead referral data entries. In some embodiments, access to some users may be restricted. For example, agents and agent team members may be enabled to create lead referral data entries, but other users (e.g., sales leaders and/or business support personnel) may be restricted from doing so. In one example, FIG. 15 illustrates a seventh view of GUI 602 presented on user computing device 600. GUI 602 is configured to display restricted referral summary window 1502, which limits some of the features included in a referral summary window, as discussed above. In one example, a user may view the lead referral information, including the hyperlinks, names of each lead referral data entry, the conversion status of each lead referral data entry, and the relationship between each lead referral and the referrer, but the user is restricted from adding new lead referral data entries. In the example, an add referral button, such as add referral button 704 on referral summary window 702 (shown in FIG. 7), is hidden from the user on restricted referral summary window 1502. In another example, FIG. 16 illustrates an eighth view of GUI 602 presented on user computing device 600. In this example, GUI 602 is configured to display restricted referral summary window 1602.

Restricted referral summary window 1602 may include an add referral button 1604 which is visible to the user. However, the user is restricted from adding new lead referral entries such that when the user attempts to select add referral button 1604 on restricted referral summary window 1602, GUI 602 may display error message 1606 to the user which indicates that the user does not have access to create new lead referral data entries.

Exemplary Embodiments and Functionality

In one aspect, a lead referral management ("LRM") computer system for real-time data synchronization within a database platform may be provided. The LRM computer system may include a lead referral management ("LRM") computing device in communication with at least one enterprise customer relationship management ("eCRM") platform and one or more data sources. The LRM computing device may include at least one processor in communication with at least one memory, and the at least one processor may be configured to: (i) cause an input page to be displayed on a user interface of a user computing device for receiving a plurality of lead referral information for a vendor, wherein the input page is configured to directly access the eCRM platform; (ii) receive, from the user computing device using the input page, lead referral information associated with a lead referral, wherein the lead referral information includes an identifier for identifying the lead referral; (iii) in response to receiving the lead referral information, create in real-time a query including the identifier, and initiating in real-time an API call directed to at least the eCRM platform and the one or more data sources, the API call including the query; (iv) cause, in real-time and using the API call, the one or more data sources and the eCRM platform to compare the identifier to existing lead referral information previously stored on the eCRM platform and the one or more data sources; (v) cause, in real-time and using the API call, (a) the eCRM platform to compare the identifier to existing lead referral information previously stored on the eCRM platform, and (b) the one or more data sources to compare the identifier to existing lead referral information previously stored on the one or more data sources; and (vi) in response to no match being found in the comparison, automatically (a) create a lead referral data entry including the lead referral information, and (b) store the lead referral data entry on the one or more data sources and the eCRM platform.

Further, the at least one processor may be configured to: (i) determine whether the selected lead referral is on a national Do-Not-Solicit ("DNS") registry list by comparing the name of the selected lead referral to each of a plurality of stored names included in the national DNS registry list; and (ii) in response to determining that the selected lead referral is on the national DNS registry list, cause to display on the user interface a notification indicating that the selected lead referral is on the national DNS registry list.

Additionally, the at least one processor may be configured to: (i) assign a conversion status to the lead referral data entry, wherein the conversion status represents an opportunity value of the lead referral; (ii) receive, from one of the one or more data sources and the user interface, a status update associated with the conversion status of the lead referral; (iii) determine, based on the status update, whether a change in the conversion status of the lead referral has occurred; (iv) assign, based on the determination, an updated conversion status to the lead referral which reflects the change; (v) determine whether the conversion status assigned to the lead referral data entry represents a high opportunity value; (vi) generate, based on the determination, a hyperlink configured to allow the user to selectively access, on the user interface, a lead referral account page associated with the lead referral data entry; (vii) display, on the user interface, at least some of the lead referral information associated with the lead referral data entry and the conversion status assigned to the lead referral data entry; and (viii) display, on the user interface, the hyperlink generated for the lead referral data entry.

The at least one processor may be also configured to: (i) assign, upon creating the lead referral data entry, a pre-defined conversion status to the lead referral data entry, wherein the pre-defined conversion status represents an opportunity value of the lead referral; (ii) receive, from the user via the user interface, a user-defined conversion status related to the lead referral data entry, wherein the user-defined conversion status represents a different opportunity value from the opportunity value represented by the pre-defined conversion status; and (iii) assign, upon receiving the user-defined conversion status from the user, the user-defined conversion status to the lead referral data entry. The LRM computer system may include additional, less, or alternative functionality including that described herein.

In another aspect, a computer-implemented method for real-time data synchronization within a database platform may be provided. The method may be implemented by a lead referral management ("LRM") system including a lead referral management ("LRM") computing device in communication with an enterprise customer relationship management ("eCRM") platform and one or more data sources, and the method may include: (i) causing an input page to be displayed on a user interface of a user computing device for receiving a plurality of lead referral information for a vendor, wherein the input page is configured to directly access the eCRM platform; (ii) receiving, from the user computing device using the input page, lead referral information associated with a lead referral, wherein the lead referral information includes an identifier for identifying the lead referral; (iii) in response to receiving the lead referral information, creating in real-time a query including the identifier, and initiating in real-time an API call directed to at least the eCRM platform and the one or more data sources, the API call including the query; (iv) causing, in real-time and using the API call, the one or more data sources and the eCRM platform to compare the identifier to existing lead referral information previously stored on the eCRM platform and the one or more data sources; (v) causing, in real-time and using the API call, (a) the eCRM platform to compare the identifier to existing lead referral information previously stored on the eCRM platform, and (b) the one or more data sources to compare the identifier to existing lead referral information previously stored on the one or more data sources; and (vi) in response to no match being found in the comparison, automatically (a) creating a lead referral data entry including the lead referral information, and (b) storing the lead referral data entry on the one or more data sources and the eCRM platform.

Further, the method may include: (i) determining whether the selected lead referral is on a national Do-Not-Solicit ("DNS") registry list by comparing the name of the selected lead referral to each of a plurality of stored names included in the national DNS registry list; and (ii) in response to determining that the selected lead referral is on the national DNS registry list, causing to display on the user interface a notification indicating that the selected lead referral is on the national DNS registry list.

Additionally, the method may include: (i) assigning a conversion status to the lead referral data entry, wherein the conversion status represents an opportunity value of the lead referral; (ii) receiving, from one of the one or more data sources and the user interface, a status update associated with the conversion status of the lead referral; (iii) determining, based on the status update, whether a change in the conversion status of the lead referral has occurred; (iv) assigning, based on the determination, an updated conversion status to the lead referral which reflects the change; (v) determining whether the conversion status assigned to the lead referral data entry represents a high opportunity value; (vi) generating, based on the determination, a hyperlink configured to allow the user to selectively access, on the user interface, a lead referral account page associated with the lead referral data entry; (vii) displaying, on the user interface, at least some of the lead referral information associated with the lead referral data entry and the conversion status assigned to the lead referral data entry; and (viii) displaying, on the user interface, the hyperlink generated for the lead referral data entry.

The method may also include: (i) assigning, upon creating the lead referral data entry, a pre-defined conversion status to the lead referral data entry, wherein the pre-defined conversion status represents an opportunity value of the lead referral; (ii) receiving, from the user via the user interface, a user-defined conversion status related to the lead referral data entry, wherein the user-defined conversion status represents a different opportunity value from the opportunity value represented by the pre-defined conversion status; and (iii) assigning, upon receiving the user-defined conversion status from the user, the user-defined conversion status to the lead referral data entry. The method may include additional, fewer, or alternative actions, including those discussed elsewhere herein.

In yet another aspect, at least one non-transitory computer-readable storage media having computer-executable instructions thereon may be provided. When executed by at least one processor in communication with at least one memory device and one or more data sources, the computer-executable instructions may cause the at least one processor to: (i) cause an input page to be displayed on a user interface of a user computing device for receiving a plurality of lead referral information for a vendor, wherein the input page is configured to directly access the eCRM platform; (ii) receive, from the user computing device using the input page, lead referral information associated with a lead referral, wherein the lead referral information includes an identifier for identifying the lead referral; (iii) in response to receiving the lead referral information, create in real-time a query including the identifier, and initiating in real-time an API call directed to at least the eCRM platform and the one or more data sources, the API call including the query; (iv) cause, in real-time and using the API call, the one or more data sources and the eCRM platform to compare the identifier to existing lead referral information previously stored on the eCRM platform and the one or more data sources; (v) cause, in real-time and using the API call, (a) the eCRM platform to compare the identifier to existing lead referral information previously stored on the eCRM platform, and (b) the one or more data sources to compare the identifier to existing lead referral information previously stored on the one or more data sources; and (vi) in response to no match being found in the comparison, automatically (a) create a lead referral data entry including the lead referral information, and (b) store the lead referral data entry on the one or more data sources and the eCRM platform.

Further, the computer-executable instructions cause the at least one processor to: (i) determine whether the selected lead referral is on a national Do-Not-Solicit ("DNS") registry list by comparing the name of the selected lead referral to each of a plurality of stored names included in the national DNS registry list; and (ii) in response to determining that the selected lead referral is on the national DNS registry list, cause to display on the user interface a notification indicating that the selected lead referral is on the national DNS registry list.

Additionally, the computer-executable instructions cause the at least one processor to: (i) assign a conversion status to the lead referral data entry, wherein the conversion status represents an opportunity value of the lead referral; (ii) receive, from one of the one or more data sources and the user interface, a status update associated with the conversion status of the lead referral; (iii) determine, based on the status update, whether a change in the conversion status of the lead referral has occurred; (iv) assign, based on the determination, an updated conversion status to the lead referral which reflects the change; (v) determine whether the conversion status assigned to the lead referral data entry represents a high opportunity value; (vi) generate, based on the determination, a hyperlink configured to allow the user to selectively access, on the user interface, a lead referral account page associated with the lead referral data entry; (vii) display, on the user interface, at least some of the lead referral information associated with the lead referral data entry and the conversion status assigned to the lead referral data entry; and (viii) display, on the user interface, the hyperlink generated for the lead referral data entry.

The computer-executable instructions further cause the at least one processor to: (i) assign, upon creating the lead referral data entry, a pre-defined conversion status to the lead referral data entry, wherein the pre-defined conversion status represents an opportunity value of the lead referral; (ii) receive, from the user via the user interface, a user-defined conversion status related to the lead referral data entry, wherein the user-defined conversion status represents a different opportunity value from the opportunity value represented by the pre-defined conversion status; and (iii) assign, upon receiving the user-defined conversion status from the user, the user-defined conversion status to the lead referral data entry. The instructions may direct additional, fewer, or alternate functionality, including that discussed elsewhere herein.

In a further aspect, a lead referral management ("LRM") computer system for real-time data synchronization within a database platform may be provided. The LRM computer system may include a lead referral management ("LRM") computing device in communication with at least one enterprise customer relationship management ("eCRM") platform and one or more data sources. The LRM computing device may include at least one processor in communication with at least one memory, and the at least one processor may be configured to: (i) cause an input page to be displayed on a user interface of a user computing device for receiving a plurality of lead referral information for a vendor, wherein the input page is configured to directly access the eCRM platform; (ii) receive, from the user computing device using the input page, lead referral information associated with a lead referral, wherein the lead referral information includes an identifier for identifying the lead referral; (iii) in response to receiving the lead referral information, create in real-time a query including the identifier, and initiating in real-time an API call directed to at least the eCRM platform and the one or more data sources, the API call including the query; (iv) cause, in real-time and using the API call, the one or more data sources and the eCRM platform to compare the identifier to existing lead referral information previously stored on the eCRM platform and the one or more data sources; (v) cause, in real-time and using the API call, (a) the eCRM platform to compare the identifier to existing lead referral information previously stored on the eCRM platform, and (b) the one or more data sources to compare the identifier to existing lead referral information previously stored on the one or more data sources; (vi) in response to a match being found in the comparison, determine that a customer relationship exists between the lead referral and a vendor; and (v) cause a message or a notification to be displayed, as a pop-up window or an overlay notification over a second screen on the user interface of the user computing device, where in the message or notification indicates that the customer relationship exists. The LRM computer system may include additional, less, or alternate functionality, including that discussed elsewhere herein.

In a still further aspect, computer-implemented method for real-time data synchronization within a database platform may be provided. The method may be implemented by a lead referral management ("LRM") system including a lead referral management ("LRM") computing device in communication with an enterprise customer relationship management ("eCRM") platform and one or more data sources, and the method may include: (i) causing an input page to be displayed on a user interface of a user computing device for receiving a plurality of lead referral information for a vendor, wherein the input page is configured to directly access the eCRM platform; (ii) receiving, from the user computing device using the input page, lead referral information associated with a lead referral, wherein the lead referral information includes an identifier for identifying the lead referral; (iii) in response to receiving the lead referral information, creating in real-time a query including the identifier, and initiating in real-time an API call directed to at least the eCRM platform and the one or more data sources, the API call including the query; (iv) causing, in real-time and using the API call, the one or more data sources and the eCRM platform to compare the identifier to existing lead referral information previously stored on the eCRM platform and the one or more data sources; (v) causing, in real-time and using the API call, (a) the eCRM platform to compare the identifier to existing lead referral information previously stored on the eCRM platform, and (b) the one or more data sources to compare the identifier to existing lead referral information previously stored on the one or more data sources; (vi) in response to a match being found in the comparison, determining that a customer relationship exists between the lead referral and a vendor; and (v) causing a message or a notification to be displayed, as a pop-up window or an overlay notification over a second screen on the user interface of the user computing device, where in the message or notification indicates that the customer relationship exists. The method may include additional, less, or alternate actions, including those discussed elsewhere herein.

In a yet further aspect, at least one non-transitory computer-readable storage media having computer-executable instructions embodied thereon for managing lead referrals is provided. When executed by at least one processor, the computer-executable instructions cause the processor to: (i) cause an input page to be displayed on a user interface of a user computing device for receiving a plurality of lead referral information for a vendor, wherein the input page is configured to directly access the eCRM platform; (ii) receive, from the user computing device using the input page, lead referral information associated with a lead referral, wherein the lead referral information includes an identifier for identifying the lead referral; (iii) in response to receiving the lead referral information, create in real-time a query including the identifier, and initiating in real-time an API call directed to at least the eCRM platform and the one or more data sources, the API call including the query; (iv) cause, in real-time and using the API call, the one or more data sources and the eCRM platform to compare the identifier to existing lead referral information previously stored on the eCRM platform and the one or more data sources; (v) cause, in real-time and using the API call, (a) the eCRM platform to compare the identifier to existing lead referral information previously stored on the eCRM platform, and (b) the one or more data sources to compare the identifier to existing lead referral information previously stored on the one or more data sources; (vi) in response to a match being found in the comparison, determine that a customer relationship exists between the lead referral and a vendor; and (v) cause a message or a notification to be displayed, as a pop-up window or an overlay notification over a second screen on the user interface of the user computing device, where in the message or notification indicates that the customer relationship exists. The instructions may direct additional, less, or alternate functionality, including that discussed elsewhere herein.

Machine Learning & Other Matters

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computing device, the user of the computing device, driver and/or vehicle, documents to be provided, the model being simulated, home owner and/or home, buyer, geolocation information, image data, home sensor data, and/or other data.

Based upon these analyses, the processing element may learn how to identify characteristics and patterns that may then be applied to training models, analyzing sensor data, authentication data, image data, mobile device data, and/or other data.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer system for real-time data synchronization within a database platform, the computer system comprising a computing device in communication with a computer platform and one or more data sources, the computing device comprising at least one processor in communication with a memory device, wherein the at least one processor is configured to:

in response to receiving user information associated with a user, (a) create, in real-time, a query including an identifier for identifying the user, and (b) initiate, in real-time, an API call directed to at least the computer platform and the one or more data sources, the API call including the query;

cause, in real-time and using the API call, (a) the computer platform to compare the identifier to existing user information previously stored on the computer platform, and (b) the one or more data sources to compare the identifier to existing user information previously stored on the one or more data sources;

in response to no match being found in the comparison, automatically (a) create, in real-time, a data entry including the received user information, and (b) store, in real-time, the data entry on the one or more data sources and the computer platform;

assign one of a plurality of conversion statuses to the data entry, the plurality of conversions statuses enabling the computer system to monitor the data entry and eliminate entry of a duplicate of the data entry;

in response to receiving additional user information associated with the user, initiate in real-time an additional API call directed to at least the computer platform and the one or more data sources, the additional user information including a customer status;

access, in real-time and using the additional API call, the computer platform and the one or more data sources to determine a current customer status associated with the user; and in response to the current customer status being different from the received customer status, automatically update the data entry on the one or more data sources and the computer platform, the update including changing the current customer status to the received customer status.

2. The computer system of claim 1, wherein the at least one processor is further configured to cause an input page to be displayed on a user computing device associated with the user, the input page configured to receive the user information, and directly access the computer platform.

3. The computer system of claim 2, wherein the at least one processor is further configured to receive, from the user computing device using the input page, the user information, the user information including the identifier.

4. The computer system of claim 1, wherein the computer platform includes an enterprise customer relationship management (CRM) platform, and wherein the user information includes lead referral information associated with the user.

5. The computer system of claim 1, wherein the at least one processor is further configured to determine that a customer relationship between the user and a vendor exists in response to determining that the current customer status is one of an existing customer, an existing prospective customer, or a customer.

6. The computer system of claim 1, wherein the at least one processor is further configured to:

receive, from a user computing device associated with the user, the additional user information; and in response to receiving the additional user information, create in real-time an additional query including the additional user information, the query included in the additional API call.

7. The computer system of claim 1, wherein the at least one processor is further configured to:

access the computer platform and the one or more data sources to identify stale data, wherein the stale data includes data being inactive for a predefined time; and in response to identifying the stale data, purge the stale data from the computer platform and the one or more data sources, thereby synchronizing data stored in the computer platform and the one or more data sources.

8. A computer-implemented method for real-time data synchronization within a database platform, the method implemented by a computer system including a computing device in communication with a computer platform and one or more data sources, the computing device including at least one processor in communication with a memory device, wherein the at least one processor is configured to:

in response to receiving user information associated with a user, (a) creating, in real-time, a query including an identifier for identifying the user, and (b) initiating, in real-time, an API call directed to at least the computer platform and the one or more data sources, the API call including the query;

causing, in real-time and using the API call, (a) the computer platform to compare the identifier to existing user information previously stored on the computer platform, and (b) the one or more data sources to compare the identifier to existing user information previously stored on the one or more data sources;

in response to no match being found in the comparison, automatically (a) creating, in real-time, a data entry including the received user information, and (b) storing, in real-time, the data entry on the one or more data sources and the computer platform;

assigning one of a plurality of conversion statuses to the data entry, the plurality of conversions statuses enabling the computer system to monitor the data entry and eliminate entry of a duplicate of the data entry;

in response to receiving additional user information associated with the user, initiating in real-time an additional API call directed to at least the computer platform and the one or more data sources, the additional user information including a customer status;

accessing, in real-time and using the additional API call, the computer platform and the one or more data sources to determine a current customer status associated with the user; and in response to the current customer status being different from the received customer status, automatically updating the data entry on the one or more data sources and the computer platform, the update including changing the current customer status to the received customer status.

9. The computer-implemented method of claim 8 further comprising causing an input page to be displayed on a user computing device associated with the user, the input page configured to receive the user information, and directly access the computer platform.

10. The computer-implemented method of claim 9 further comprising receiving, from the user computing device using the input page, the user information, the user information including the identifier.

11. The computer-implemented method of claim 8, wherein the computer platform includes an enterprise customer relationship management (eCRM) platform, and wherein the user information includes lead referral information associated with the user.

12. The computer-implemented method of claim 8 further comprising determining that a customer relationship between the user and a vendor exists in response to determining that the current customer status is one of an existing customer, an existing prospective customer, or a customer.

13. The computer-implemented method of claim 8 further comprising:

receiving, from a user computing device associated with the user, the additional user information; and in response to receiving the additional user information, creating in real-time an additional query including the additional user information, the query included in the additional API call.

14. The computer-implemented method of claim 8 further comprising:

accessing the computer platform and the one or more data sources to identify stale data, wherein the stale data includes data being inactive for a predefined time; and in response to identifying the stale data, purging the stale data from the computer platform and the one or more data sources, thereby synchronizing data stored in the computer platform and the one or more data sources.

15. At least one non-transitory computer-readable storage medium having computer-executable instructions embodied thereon, wherein when executed by at least one processor included in a computing device in communication with a computer platform and one or more data sources, the computer-executable instructions cause the at least one processor to:

in response to receiving user information associated with a user, (a) create, in real-time, a query including an identifier for identifying the user, and (b) initiate, in real-time, an API call directed to at least the computer platform and the one or more data sources, the API call including the query;

cause, in real-time and using the API call, (a) the computer platform to compare the identifier to existing user information previously stored on the computer platform, and (b) the one or more data sources to compare the identifier to existing user information previously stored on the one or more data sources;

in response to no match being found in the comparison, automatically (a) create, in real-time, a data entry including the received user information, and (b) store, in real-time, the data entry on the one or more data sources and the computer platform;

assign one of a plurality of conversion statuses to the data entry, the plurality of conversions statuses enabling the computer device to monitor the data entry and eliminate entry of a duplicate of the data entry;

in response to receiving additional user information associated with the user, initiate in real-time an additional API call directed to at least the computer platform and the one or more data sources, the additional user information including a customer status;

access, in real-time and using the additional API call, the computer platform and the one or more data sources to determine a current customer status associated with the user; and in response to the current customer status being different from the received customer status, automatically update the data entry on the one or more data sources and the computer platform, the update including changing the current customer status to the received customer status.

16. The at least one non-transitory computer-readable storage medium of claim 15, wherein the computer-executable instructions further cause the at least one processor to cause an input page to be displayed on a user computing device associated with the user, the input page configured to receive the user information, and directly access the computer platform.

17. The at least one non-transitory computer-readable storage medium of claim 15, wherein the computer platform includes an enterprise customer relationship management (eCRM) platform, and wherein the user information includes lead referral information associated with the user.

18. The at least one non-transitory computer-readable storage medium of claim 15, wherein the computer-executable instructions further cause the at least one processor to determine that a customer relationship between the user and a vendor exists in response to determining that the current customer status is one of an existing customer, an existing prospective customer, or a customer.

19. The at least one non-transitory computer-readable storage medium of claim 15, wherein the computer-executable instructions further cause the at least one processor to:

receive, from a user computing device associated with the user, the additional user information; and in response to receiving the additional user information, create in real-time an additional query including the additional user information, the query included in the additional API call.

20. The at least one non-transitory computer-readable storage medium of claim 15, wherein the computer-executable instructions further cause the at least one processor to:

access the computer platform and the one or more data sources to identify stale data, wherein the stale data includes data being inactive for a predefined time; and in response to identifying the stale data, purge the stale data from the computer platform and the one or more data sources, thereby synchronizing data stored in the computer platform and the one or more data sources.

* * * * *